US012629611B2

(12) United States Patent
Dasharathi et al.

(10) Patent No.: US 12,629,611 B2
(45) Date of Patent: May 19, 2026

(54) MEMBRANE SEALING LAYER AND SPACER RING FOR VIRAL CLEARANCE CHROMATOGRAPHY DEVICE

(71) Applicant: Solventum Intellectual Properties Company, Maplewood, MN (US)

(72) Inventors: Kannan Dasharathi, St. Paul, MN (US); Jonathan F. Hester, Hudson, WI (US); Gregory M. Jellum, Marine on St. Croix, MN (US); Angelines Castro Forero, Hudson, WI (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 777 days.

(21) Appl. No.: 17/998,525

(22) PCT Filed: Apr. 22, 2021

(86) PCT No.: PCT/IB2021/053327
§ 371 (c)(1),
(2) Date: Nov. 11, 2022

(87) PCT Pub. No.: WO2021/229327
PCT Pub. Date: Nov. 18, 2021

(65) Prior Publication Data
US 2023/0182039 A1      Jun. 15, 2023

Related U.S. Application Data

(60) Provisional application No. 63/023,488, filed on May 12, 2020.

(51) Int. Cl.
*B01D 15/22*          (2006.01)
*B01D 61/14*          (2006.01)
(Continued)

(52) U.S. Cl.
CPC .......... B01D 15/22 (2013.01); B01D 61/147 (2013.01); B01D 69/02 (2013.01); B01D 69/10 (2013.01);
(Continued)

(58) Field of Classification Search
CPC ........... B01D 15/22; B01D 2325/0212; B01D 2325/022; B01D 2325/04; B01D 61/147;
(Continued)

(56) References Cited

U.S. PATENT DOCUMENTS 4,675,104 A      6/1987   Rai
4,895,806 A      1/1990   Le et al.
(Continued)

FOREIGN PATENT DOCUMENTS

CA          2077861 A1      3/1993
CN      115551610 A      12/2022
(Continued)

OTHER PUBLICATIONS

International Search Report for PCT International Application No. PCT/IB2021/053327, mailed on Jul. 21, 2021, 5 pages.

*Primary Examiner* — Jennifer Wecker
(74) *Attorney, Agent, or Firm* — HYLTON-RODIC LAW PLLC

(57) ABSTRACT

A chromatography device having a housing having an inlet and an outlet. At least two layers of media disposed between the inlet and the outlet inside of the housing forming a media stack, with at least one of the layers comprising a functionalized layer. An optional spacer ring disposed between the two layers of media forming an air gap between them. A non-functionalized sealing layer disposed between the inlet and the outlet inside of the housing as the last layer of media in the media stack within the housing as a fluid passes from the inlet to the outlet through the media stack. A margin of the sealing layer in contact with the housing; the margin being compressed by the housing forming a compressive seal to prevent fluid from leaking to the outlet past the compressive seal.

26 Claims, 11 Drawing Sheets

(51) Int. Cl.

| | |
|---|---|
| *B01D 69/02* | (2006.01) |
| *B01D 69/10* | (2006.01) |
| *B01D 71/56* | (2006.01) |

(52) U.S. Cl.
CPC ...... *B01D 71/56* (2013.01); *B01D 2325/0212* (2022.08); *B01D 2325/022* (2013.01); *B01D 2325/04* (2013.01)

(58) Field of Classification Search
CPC ........ B01D 69/02; B01D 69/10; B01D 71/56; G01N 2030/8831; G01N 30/52; G01N 30/60
See application file for complete search history.

(56) References Cited

U.S. PATENT DOCUMENTS

| | | | |
|---|---|---|---|
| 5,438,128 A | 8/1995 | Nieuwkerk | |
| 6,264,044 B1 | 7/2001 | Meyering et al. | |
| 6,579,459 B2 | 6/2003 | Gjerde | |
| 9,650,470 B2 | 5/2017 | Bothof et al. | |
| 9,821,276 B2 | 11/2017 | Berrigan et al. | |
| 10,017,461 B2 | 7/2018 | Bothof et al. | |
| 2002/0014449 A1* | 2/2002 | Rios | B07C 3/14 |
| | | | 210/388 |
| 2005/0167354 A1 | 8/2005 | Caze et al. | |
| 2005/0211615 A1 | 9/2005 | Dileo | |
| 2010/0155323 A1 | 6/2010 | Weiss et al. | |
| 2015/0060342 A1 | 3/2015 | Dileo et al. | |
| 2017/0136416 A1 | 5/2017 | Leuthold | |
| 2018/0257042 A1* | 9/2018 | Hester | B01D 63/14 |
| 2022/0062790 A1* | 3/2022 | Dasharathi | G01N 30/60 |

FOREIGN PATENT DOCUMENTS

| | | |
|---|---|---|
| EP | 4149648 A1 | 3/2023 |
| JP | 2023529799 A | 7/2023 |
| WO | 0050888 W | 8/2000 |
| WO | 0205934 W | 1/2002 |
| WO | 200205934 A2 | 1/2002 |
| WO | 2012012172 A2 | 1/2012 |
| WO | 2020148607 A1 | 7/2020 |

* cited by examiner

MEMBRANE SEALING LAYER AND SPACER RING FOR VIRAL CLEARANCE CHROMATOGRAPHY DEVICE

CROSS REFERENCE TO RELATED APPLICATIONS

This application is a national stage filing under 35 U.S.C. 371 of PCT/IB2021/053327, filed Apr. 22, 2021, which claims the benefit of Provisional Application No. 63/023, 488, filed May 12, 2020, the disclosure of which is incorporated by reference in its/their entirety herein.

BACKGROUND

In the bioprocessing industry, there are several examples of virus contamination of recombinant proteins, vaccines and plasma products. The sources of contamination can be either adventitious, i.e. raw materials, the environment or endogenous, i.e. expressed in cells or retro virus like particles (RVLPs). Cell lines such as Chinese Hamster Ovary (CHO), contain retroviral sequences in their chromosomes which can result in shedding of a large number of RVLPs. To safe-guard against viral contamination, biopharmaceutical manufacturers often adopt a multi-layer strategy involving virus safety of raw materials, testing of in-process and final product, and implementation of viral-clearance technologies.

SUMMARY

Biopharmaceutical manufacturers often rely on more than one viral-clearance technology that can involve virus inactivation by low pH hold, solvent or detergent use, heat, irradiation or ultraviolet light, virus removal by precipitation, chromatography and/or filtration. Virus removal by chromatography can involve the use of functional chemistry to adsorb viruses and virus like particles (VLPs). Viruses and VLPs are typically 15-400 nm in size. Membrane chromatography devices aimed for virus removal can utilize membranes coated, grafted, or otherwise functionalized with certain functional chemistries to adsorb viruses and VLPs. In order to ensure adequate removal of viruses and VLP contaminants, membrane chromatography devices must be sealed exceptionally well at the interface between the membrane layer and the housing.

It has been found by experimentation that it is extremely challenging to seal membranes with functional chemistries to achieve approximately 7 Log Reduction Value (LRV) of virus clearance. A 7 LRV corresponds to 99.99999% of virus removal. While regulatory agencies currently do not explicitly state the amount of virus that needs to be removed during processing, the industry targets cumulative removal of approximately 12-15 LRV for endogenous viruses and approximately 6-8 LRV for adventitious viruses, which might be achieved with more than one viral clearance step. A single viral clearance step is generally deemed effective if it achieves greater than or equal to 4 LRV.

In flat sheet chromatography devices, the membrane or media edge is often sealed by compression. This creates a localized zone near the edge where membrane or media permeability can be reduced. In the case of membranes with functional chemistries, the membrane's morphology changes as it interacts with viral solutions. Thus, devices with functionalized membranes may not seal as effectively as desired against the housing by compression. This can lead to lower log reduction values when challenged with viral solutions.

The present invention resides in a sealing layer positioned as the last layer that the fluid passes through from the inlet to the outlet within a stack of at least two layers inside of the chromatography device. This sealing layer is in contact with the housing and at least a portion of its perimeter forms a compression seal in the device. The sealing layer is a "non-functionalized" layer as defined herein. It has been found that "functionalized" layers as defined herein do not achieve as good of a compression seal and the LRV of a chromatography device when this is the last layer in contact with the housing for sealing is less than a similarly constructed chromatography device having the same functionalized layer construction but only having the addition of a sealing layer as the last layer in contact with the housing.

Hence in one embodiment, the invention resides in a chromatography device having a housing having an inlet and an outlet; at least one functionalized media layer disposed between the inlet and the outlet inside of the housing; a non-functionalized sealing layer disposed between the inlet and the outlet inside of the housing as the last layer of media in a media stack within the housing as a fluid passes from the inlet to the outlet through the media stack; and a margin of the sealing layer in contact with the housing; the margin being compressed by the housing forming a compressive seal to prevent fluid from leaking to the outlet past the compressive seal.

The present invention also resides in a spacer ring between media layers in the chromatography device to increase the Dynamic Binding Capacity of the chromatography device. The function of the spacer ring is to provide an air gap between a proceeding media layer and the following media layer in the direction of fluid flow in the chromatography device.

Without wishing to be bound by theory, it is believed that the air gap allows for more rapid dispersion of liquids to the media's edges thereby helping to prevent the challenge fluid from prematurely tunneling through just the media's center. The air gap can provide for direct fluid flow to the media's edges instead of relying on capillary action to move fluid to the media's edges. Additionally, certain media, such as functionalized nonwovens, can swell upon contact with liquids and this swelling action may result in undesirable tunneling preventing fluid from dispersing to the media's edges. By spacing the layers apart just a bit, an air gap can be provided that allows for liquid exiting one media layer to flow laterally prior to entering the next media layer. Additionally, the air gap can provide a space to accommodate swelling of the functionalized media that might otherwise cause a high compressive stress within media layers adjacent to one another as they swell against each other. Thus, the center of the media can expand and lead to more liquid flowing through it.

Hence in another embodiment, the invention resides in a chromatography device having a housing having an inlet, and an outlet; at least two layers of media disposed between the inlet and the outlet inside of the housing, with at least one of the layers comprising a functionalized layer; and a spacer ring disposed between the two layers of media forming an air gap between them.

When one is presented simultaneously with the problem of both increasing the Dynamic Binding Capacity and the LRV of the chromatography device, the use of both at least one spacer ring and a sealing layer in contact with the housing as the last layer the fluid passes through in the chromatography device has been particularly effective.

Hence in one embodiment, the invention resides in, a chromatography device having a housing having an inlet and an outlet; at least two layers of media disposed between the inlet and the outlet inside of the housing forming a media stack, with at least one of the layers comprising a functionalized layer; a spacer ring disposed between the two layers of media forming an air gap between them; a non-functionalized sealing layer disposed between the inlet and the outlet inside of the housing as the last layer of media in the media stack within the housing as a fluid passes from the inlet to the outlet through the media stack; and a margin of the sealing layer in contact with the housing; the margin being compressed by the housing forming a compressive seal to prevent fluid from leaking to the outlet past the compressive seal.

DETAILED DESCRIPTION

Figure 1:
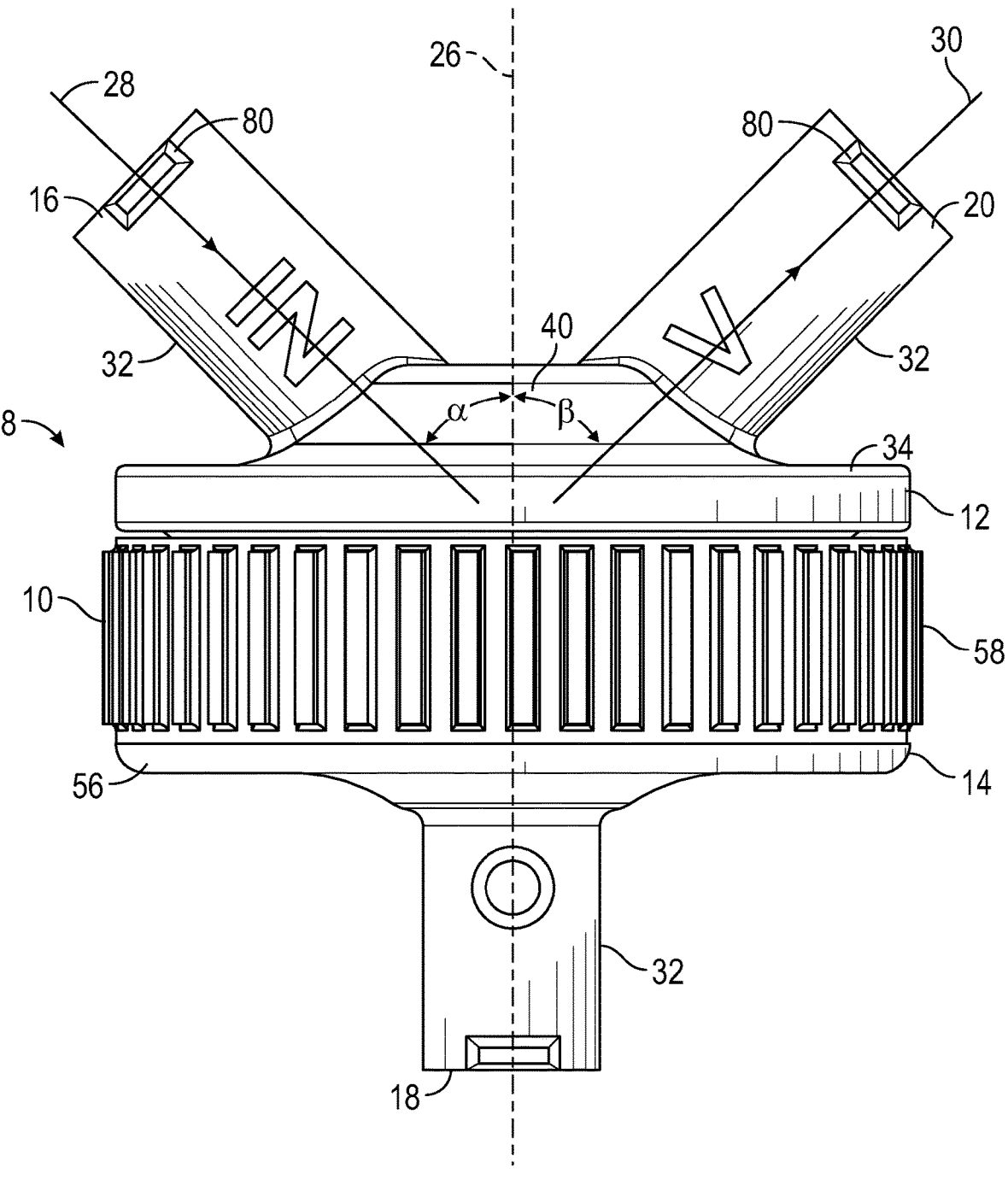
FIG. 1 is a front view of one embodiment of a chromatography device.
Figure 2:
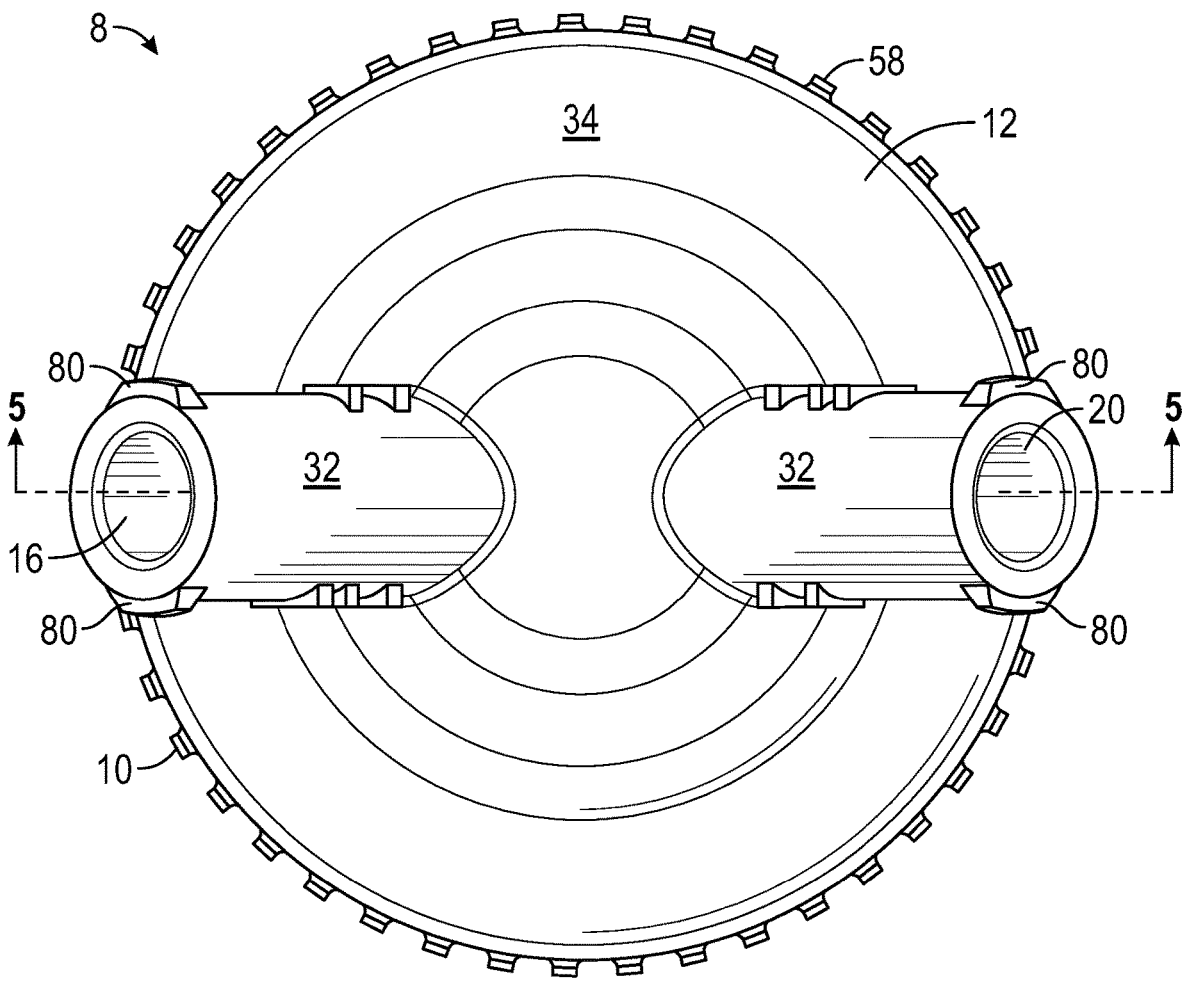
FIG. 2 is a top view of the chromatography device of FIG. 1.
Figure 3:
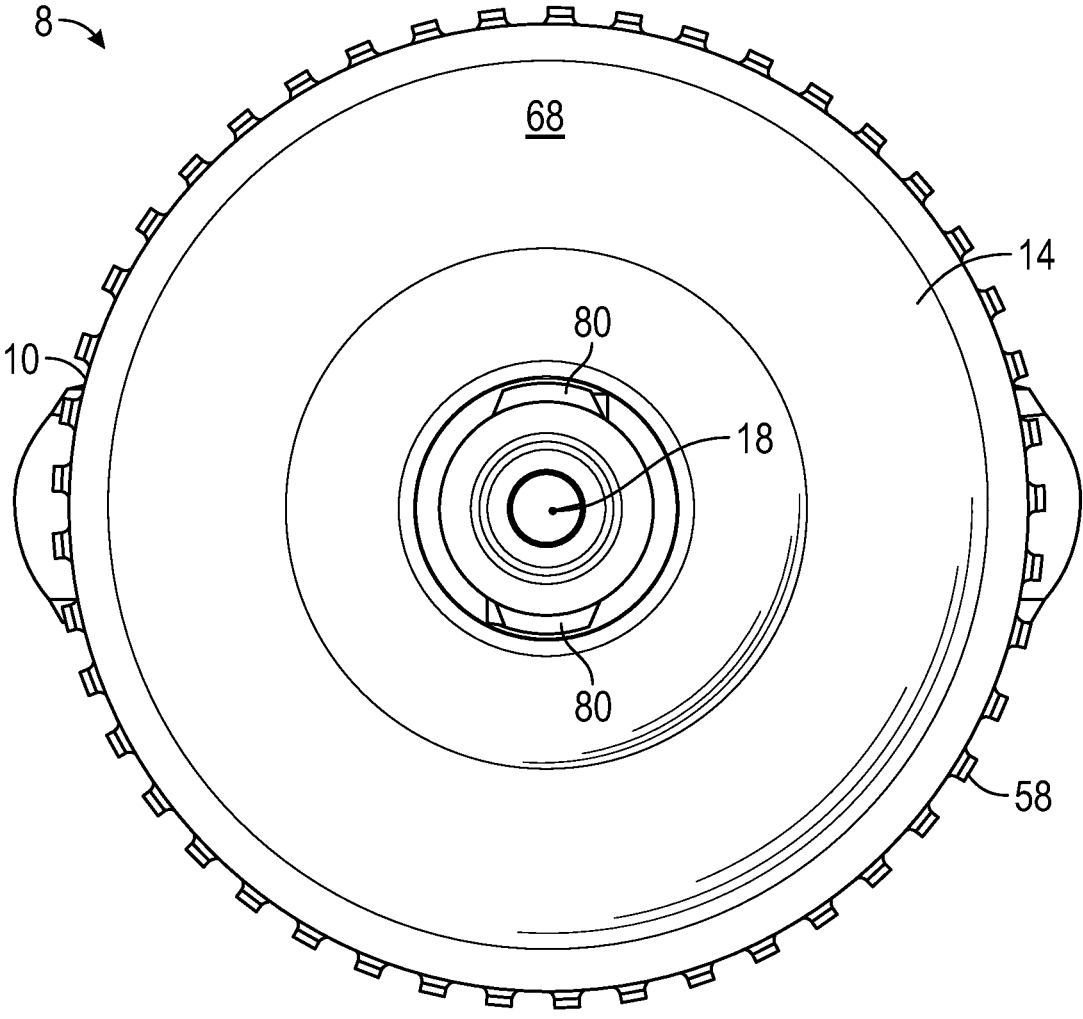
FIG. 3 is a bottom view of the chromatography device of FIG. 1.
Figure 4:
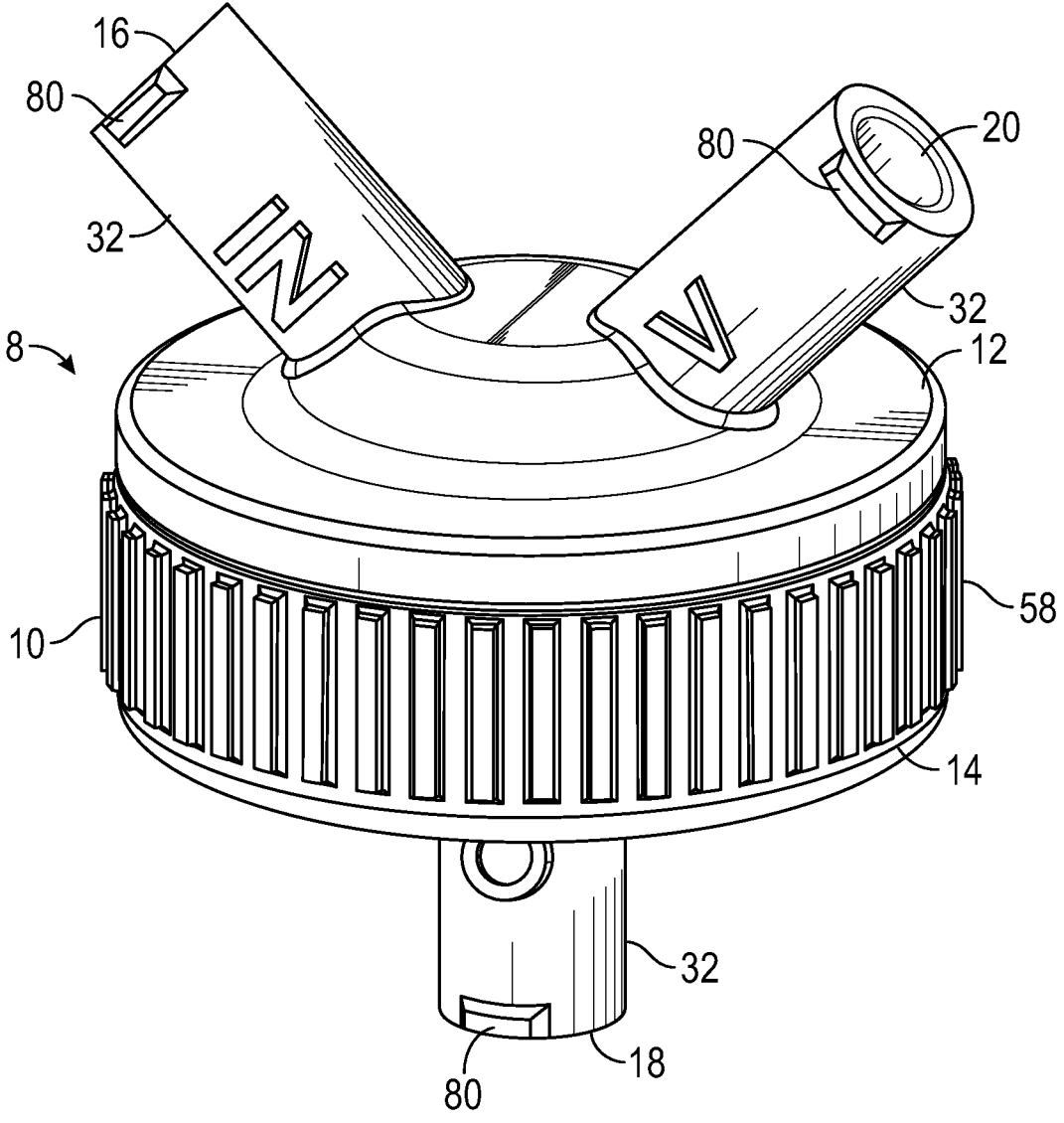
FIG. 4 is a perspective view of the chromatography device of FIG. 1.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

The term "about" as used herein can allow for a degree of variability in a value or range. For example, within 10%, within 5%, or within 1% of a stated value or of a stated limit of a range and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than or equal to about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less.

As used herein "layer" means a thickness of material the fluid to be processed passes through wherein the material in the layer is all formed from the same material. A layer can be a monolithic layer formed from a thickness of the same material. Or a layer can have one or more discrete plies of material stacked one on top of another within the layer to form its thickness. For example, a layer of common facial tissue is often a tissue paper material that is made from two individual plies of tissue paper placed in face to face contact and the two individual plies can be easily separated from each other as they are commonly held together by weak mechanical bonds in the form of crimp lines.

As used herein "a ply or plies" is a single thickness of material that can be processed by conventional converting operations such as, but not limited to, winding, folding, cutting, or stacking into a layer. Often a ply is a thickness of material after it completes the formation process on a web manufacturing machine. Thereafter, one or more plies many be stacked to form a layer. For example, a nonwoven can be made as a single ply on a formation machine and wound into a roll. Thereafter, the nonwoven roll may be unwound and folded in half in the cross-machine direction by a folding board as it passes longitudinally through a converting machine and then the two-ply layer cut into discs by a cutting die to form a circular layer of the nonwoven material having two discrete plies.

As used herein a "functionalized layer" is a layer that will attract target particles or molecules by attractive forces such as electrostatic forces due to the presence at the surfaces of that layer of one or more of chemical moieties, ligands, or functional groups that are distinct from the materials forming the bulk of the layer which are providing primarily its structural shape and integrity. The chemical moieties, ligands, or functional groups are specifically intended to attract the target particles or molecules to the surfaces of the functionalized layer. Functionalized layers may be created by coating or grafting a porous layer with ligands, monomers, or polymers designed to molecularly attract the target particles or molecules. Alternatively, functionalized layers may be created by the provision, in the formulation used to make such layers, of surface modifying polymers or chemical moieties that become localized at the surfaces of the layer during its formation, resulting in the presence on the surfaces of the layer of chemical groups designed to attract the target particles or molecules. In some embodiments, the attractive force between the functional groups on the surfaces of the functionalized layer are electrostatic forces, and the chemical moieties, ligands, or polymers present on the surfaces of the functionalized layer are electrostatically charged. A functionalized layer may have a positive charge and attract negatively charged particles, i.e. anion exchange chromatography, or the functionalized layer may have a negative charge and attract positively charged particles, i.e. cation exchange chromatography. In other embodiments, the attractive forces may be Van der Waals forces, and the target particles or molecules are attracted to the functional groups on the functionalized layer surfaces by mutual relative concentration or paucity of polarizable or hydrogen bonding moieties (i.e., hydrophobic interaction chromatography). Further, the attractive forces may include a combination of electrostatic and Van der Waals forces (i.e., mixed mode chromatography). Functionalized material suitable for the functionalized layers in chromatography devices are made by Pall, Millipore, and Sartorious and sold under the following brands: Mustang® Q, NatriFlo® HD-Q and Sartobind® Q. Functionalized layers suitable for use in chromatography devices can be nonwovens, membranes, or other suitable materials. A preferred functionalized nonwoven material is made by 3M Company and disclosed in U.S. Pat. No. 9,821,276 entitled "Nonwoven Article Grafted with Copolymer." A preferred functionalized membrane is made 3M Company and disclosed in U.S. Pat. Nos. 9,650,470; and 10,017,461 entitled "Method of Making Ligand Functionalized Substrates." All three mentioned patents are herein incorporated by reference in their entirety.

As used herein a "non-functionalized layer" is a layer without coated, grafted, or surface-localized attractive chemical moieties (e.g., electrostatically charged chemical moieties, ligands, or functional groups) distinct from the materials forming the bulk of the layer.

As used herein a "media stack" is all of the material layers the fluid to be processed passes through within the housing as the fluid moves from the inlet, through the housing, to the outlet.

As used herein, a "membrane" refers to a synthetic liquid permeable membrane comprising a sheet of material in which are disposed a plurality or an interconnected network of pores enabling passage of fluid through the membrane. Such membranes include polymeric membranes which are commonly made by phase inversion processes wherein a homogeneous solution of one or more polymers in a suitable solvent or combination of solvents is caused to undergo phase separation to form a porous structure. Phase separation can be brought about by introducing a film of the homogeneous solution to a nonsolvent bath (known as diffusion induced phase separation) or to a nonsolvent atmosphere (known as vapor induced phase separation) or by changing the temperature of the homogeneous solution (known as thermally induced phase separation). Alternatively, pores can be formed in polymeric sheets by stretching processes or by irradiation processes (track etch membranes). Membranes can have pore sizes of about 0.1 to about 20 micrometers in diameter (microporous membranes) or pore sizes less than about 0.1 micrometers (ultraporous membranes). Suitable polymers for forming membranes include cellulose acetate, nitrocellulose, cellulose esters, polysulfones including Bisphenol A polysulfone and polyethersulfone, polyacrylonitrile, polyamides (e.g., Nylon-6 and Nylon-6,6), polyimides, polyethylene, polypropylene, polytetrafluoroethylene, polyvinylidene fluoride, polyvinylchloride, and ethylene-chlorotrifluoroethylene copolymers.

As used herein "Dynamic Binding Capacity (DBC)" means the mass of a target molecule captured from a challenge solution by the media layer(s) at a specified flow rate as a function of the layer(s) projected area with an endpoint defined as a specified concentration of the target molecule being detected in the device effluent. Thus, if the chromatography device has three media layers between the inlet and the outlet, the fluid-contacting frontal surface area of only one layer is used in the calculation.

As used herein a "challenge solution" means a solution with an accurately known concentration of a target molecule that may be selectively bound to the device's membrane (media).

In one embodiment, the challenge solution has a target value of 1 mg/mL Bovine Serum Albumin (BSA). An aqueous 25 mM Tris 50 mM Sodium Chloride (NaCl) solution is made by slowly dissolving 3.029 g of the Tris base and 2.922 g of NaCl in 1 L of De-Ionized (DI) water. While measuring the pH, add small amounts of concentrated Hydrochloric (HCl) acid to adjust the pH to 8. Approximately 300 mg of BSA is sprinkled on the surface of 25 mM Tris 50 mM NaCl buffer solution. The BSA is allowed to dissolve in the buffer by slow hydration for at least 1 hour. The solution is then passed through 0.2 μm filter into a sterile media bottle. Absolute concentration of the BSA is determined using Beers Law by measuring the UV absorbance of the solution at 280 nm with 0.667 as the extinction coefficient (ε)b.

To determine a chromatography device's BSA DBC, the solution is passed through the through the test device at the standard flow condition of 210 LMH (liters per meter² media frontal surface area per hour). Endpoint is determined by breakthrough of the BSA challenge solution as indicated by a 10% absorbance value of the effluent (based on initial BSA solution defined as 100%) using UV detection at 280 nm.

The dynamic binding capacity is then determined using the volume of challenge solution passed through the test device prior to reaching the endpoint condition and calculating the mass of BSA in that volume. Dynamic binding capacity is this mass divided by the effective membrane (media) area as shown in Equation 1.

$$DBC_{(mg/cm^2)} = \frac{[\text{breakthrough volume (mL)} - \text{system holdup volume (mL)}] - [BSA \text{ Concentration (mg/mL)}]}{\text{surface area (cm}^2)} \tag{1}$$

In another embodiment, the challenge is 20 mM Potassium Chloride. The Chloride (Cl⁻) DBC of the chromatography device is measured using the procedure described in the U.S. patent application Ser. No. 67/783,319 entitled Method For Testing A Chromatography Device Used For Ion Exchange filed on Dec. 21, 2018, and incorporated herein by reference in its entirety, but particularly as described starting on page 33, line 0096 and ending on page 35, line 00109.

In another embodiment, the challenge solution has a target value of $1 \times 10^8$ plaque forming units (PFU)/mL of bacteriophage Phi-X 174 to determine the LRV. Initially, stocks of at least $1 \times 10^{11}$ PFU/mL of Phi-X 174 are grown. An aqueous 50 mM Tris solution is made by slowly dissolving 6.057 g of the Tris base in a 1 L of De-Ionized (DI) water. While measuring the pH, add small amounts of concentrated Hydrochloric (HCl) acid to adjust the pH to 8. Check the conductivity to ensure it is at 20 mS/cm and adjust by either adding small amounts of Tris or DI water. The Phi-X 174 stock is diluted to a concentration of $1 \times 10^8$ PFU/mL in a 50 mM Tris-HCl buffer solution having a pH 8 and a conductivity of 20 mS/cm. A small aliquot of this viral challenge solution is saved as an "input" sample for LRV calculation.

To determine the chromatography device's viral log reduction value, the input and the eluate solutions are plated in the presence of the bacteria, *Escherichia coli* (*E. coli*) in various dilutions. 50 µL of *E. coli* 13076 host are added per 100 µL of each input or output dilution in a 5 mL tube. 2.5 mL of nutrient broth top agar (nutrient broth supplemented with 0.6% agar) were added per tube and then mixed via a twirling motion to ensure a well-mixed solution. The solutions were then poured onto the surface of a nutrient agar plate and allowed to solidify before incubation at 37° C. for three hours. After incubation, Phi-X 174 viral plaques formed as circular areas of clearing in the lawn of *E. coli* growth. The plaques of the resulting input and eluate plates were then counted to determine the concentration (PFU/mL) using Equation 2.

$$C = \text{Avg.Number of Plaques} \times \text{Dilution} \div \text{Volume plated} \tag{2}$$

The concentrations are used to determine the final viral clearance reduction as per Equation 3.

$$LRV = \log_{10}[(C_{Feed} \times Vol_{Feed})/(C_{Final} \times Vol_{Final})] \tag{3}$$

Membrane chromatography is a relatively new method of ion exchange chromatography which evolved from the bioprocessing industry's need to overcome the limitations of the conventional resin-bead based chromatography. A membrane chromatography device comprises a microporous media with pores containing adsorptive sites that can bind the target protein and/or viruses and VLPs depending on the functional chemistry and run conditions. Since membrane chromatography devices rely on convective mass transfer, higher flow rates can be used without significant pressure drop, resulting in higher throughputs and reduced processing times. There are three major types of membrane-based chromatography devices: flat sheet, hollow fiber and radial flow. Flat sheet chromatography devices are typically more popular because they have more absorbent membrane volume.

Membrane chromatography devices come in various sizes often related to the development stage of the molecule. Laboratory devices typically have media volumes from about 0.08 to 3 mL. Scale-up or prototype devices typically have media volumes from about 15 to 100 mL. Commercial production devices typically have media volumes greater than or equal to 200 mL. It should be noted that other media volumes can be provided depending on the needs of the customer.

One way of calculating media volume is to multiply the effective filtration area (EFA) with the nominal media height or thickness. Nominal media height or thickness can be measured using calipers and the EFA can be measured by filtering a dye solution through the device. The dye binds to the media and after the dye breaks through to the outlet stream, the device is cut apart and diameter of dye stain in the layer(s) of the media is measured to determine the average diameter or the stained area can be directly measured for example using optical methods. The average diameter of the dye stain (if more than one layer) is used to calculate the EFA using the equation for the area of a circle or the measured areas for each layer can be averaged to find the EFA.

The invention can be used with any desired media volume, and it is particularly suited to chromatography devices aimed at viral clearance. While the invention is referred to as "Chromatography device" and "Membrane chromatography device", all aspects of this invention are equally applicable to hybrid media constructions that include functionalized membrane and other kinds of filtration and chromatography media such as (but not limited to) hydrogel functionalized nonwoven, cellulose and diatomaceous earth based charged media, activated carbon.

While the invention can be used with any desired media volume, a laboratory scale chromatography device as described in U.S. patent application Ser. No. 62/792,166 filed Jan. 14, 2019 entitled Sample Size Chromatography Device and herein incorporated by reference in its entirety is particularly suitable. In one embodiment, a media volume of 0.08 mL was used to minimize the amount of viral solution needed for the examples. Hold up volume for this chromatography device was measured to be about 1.1 mL.

Laboratory Scale Chromatography Device

Referring now to FIGS. 1, 2, 3, 4, and 5 a preferred example of chromatography device 8 is shown. The device has a housing 10 formed by joining an upper housing 12 to a lower housing 14. The housing has an inlet 16, an outlet 18, and an optional vent 20. Disposed between the inlet 16 and the outlet 18 is a membrane or media 22 in a chamber 24 such that fluid from the inlet 16 enters the internal chamber 24 and then passes through the media 22 and out the outlet 18. The sealing layer, spacer ring, or combinations thereof of the present invention can be used with any suitable housing having an inlet, an outlet, and a media stack disposed between them for the fluid to pass through.

The chamber 24 is in fluid communication with the inlet 16 and the vent 20 such that any air in the chamber 24 can be purged out the vent 20. A Luer lock connector (not shown) can be attached to the vent 20 and used as a valve to purge the air from the chamber 24 until liquid from the inlet 16 begins to exit from the vent 20 and the valve is closed. In the illustrated embodiment, the membrane volume is 0.08 mL, but this can be readily changed by increasing or decreasing the diameter of the media and adjusting the size of the housing to that diameter.

As seen in FIG. 1, at least one of the inlet 16 and the vent 20 can be disposed at an angle to the longitudinal axis 26 of the housing 10 and preferably both are disposed at an angle to the longitudinal axis. As seen, the inlet 16 is disposed at an angle α to the housing longitudinal axis 26 and the vent is disposed at an angle β to the housing longitudinal axis. This provides two benefits. First it provides sufficient clearance for the use of Luer lock connectors on both the inlet 16 and the vent 20 to be used providing for a fast and convenient method to purge air from the chamber 24. An axially aligned inlet does not provide sufficient clearance in small-volume laboratory devices to include a vent with a positive lock seal such as a Luer lock connector.

Figure 5:
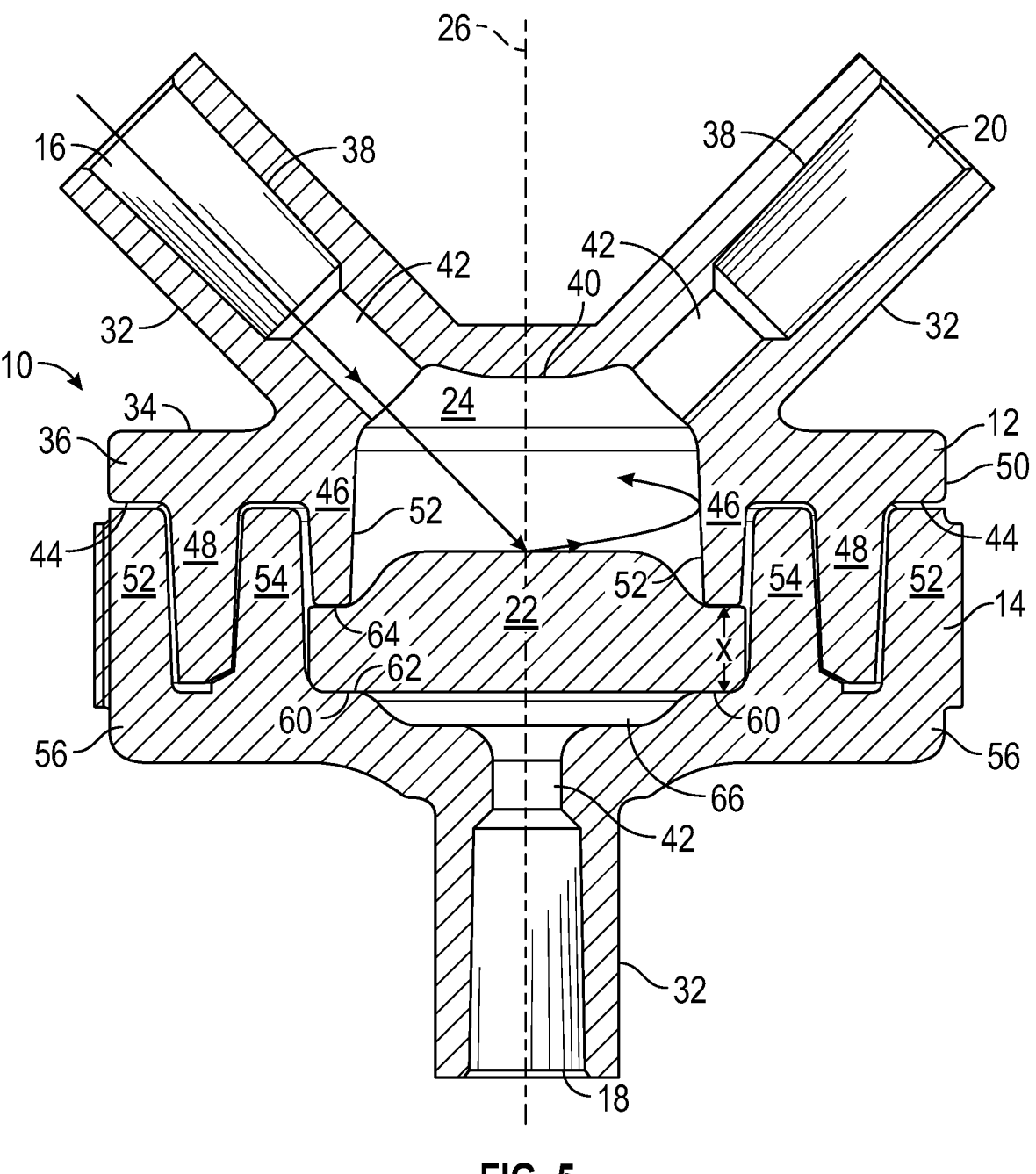
FIG. 5 is a cross section view of the chromatography device taken at 5-5 in FIG. 2.

Secondly, an angled inlet 16 directs the incoming fluid flow as it is passing through the chamber 24 to hit the media's upper surface at an angle other than 90 degrees as shown by the arrow in FIG. 5. With the inlet axially aligned parallel to the longitudinal axis 26, the incoming fluid strikes the media's surface at approximately 90 degrees directly in the center of the media. This design suffers from a tunneling problem, that causes the feed solution to "tunnel" through the disc's center leading to premature breakthrough. Angling the inlet 16 such that the incoming fluid flow has a tangential direction velocity component parallel to the media's upper surface will cause at least some of the incoming fluid to flow across at least a portion of the media's upper surface prior to flowing through the media. This is not unlike the action of throwing a pail of water onto a floor at angle to flush the floor and spread the water along the floor in a direction away from the person emptying the pail. Angling the inlet not only helps to prevent tunneling, but also helps drive air from the chamber 24 towards and out of the vent 20. The angular position of the inlet can be designed such that a volume of buffer or solute flowing into the device does not immediately permeate the media due to surface tension and edge effects, and instead flows on top of the media and into the chamber wall. This motion of an incoming fluid volume results in an automatic redistribution and mixing within the chamber thereby providing a more uniform utilization of the media's capacity.

In various embodiments of the device, the angle α between the longitudinal axis 28 of the inlet and the housing longitudinal axis 26 can be from about 10 to about 80 degrees, from about 25 to about 65 degrees, or from about 40 to about 50 degrees. In various embodiments of the device, the angle θ between the longitudinal axis 30 of the vent and the housing longitudinal axis 26 can be from about 10 to about 80 degrees, from about 25 to about 65 degrees, or from about 40 to about 50 degrees. The angle α can be the same as, less than or greater than the angle β. Additionally, if only one of the inlet and the vent is angled for Luer lock clearance, preferably the inlet is angled for the positive flow effects described above. In the illustrated embodiment, the angle α was 45 degrees and the angle R was 45 degrees such that the inlet and the vent can be interchanged if needed and used for the opposite function.

The upper housing 12 and lower housing 14 are designed to be ultrasonically welded together to form the final liquid tight housing while also providing an edge seal for the media. In particular, the force applied to the housing acting to compress the upper and lower housing portions during assembly is controlled while ultrasonic welding to reliably control the compression of the media regardless of changes in media thickness. More about the unique welding process will be discussed latter. The housing 10 is generally circular, but any other suitable shape may be employed.

As best seen in FIG. 5, the upper housing 12 includes two cylindrical projections 32 extending from an upper surface 34 of an upper disc 36 on each side of the housing longitudinal axis 26 and disposed at an angle to the housing longitudinal axis forming a truncated V-shape between them. Each cylindrical projection has a tapered internal bore 38 to fit the Luer lock taper and is in fluid communication with the chamber 24. A truncated hemispherical surface 40 is present inside the chamber 24 and is molded into the center of the upper disc 36 between the inlet and the outlet to reduce the chamber's volume. The tapered bores 38 of the inlet and vent are in fluid communication with a cylindrical passage 42 that leads to the chamber 24 thus providing for the passage of fluid though the tapered bore into the cylindrical passage and into the chamber of the assembled housing. The chamber is generally cylindrical in shape with a truncated hemispherical upper surface as shown. Other chamber shapes may be employed and, in general, the overall size of the chamber is as small as possible to reduce hold-up volume while still allowing for fluid communication between the inlet, the vent, the chamber, and the surface of the media.

As used herein upper housing 12 is a relative term for convenience and in one embodiment is the housing portion having both the inlet 16 and the vent 20 into the chamber 24. In a like manner, lower housing is a relative term for convenience. First housing portion can be used instead for the upper housing and second housing portion can be used instead for the lower housing. Throughout the specification for any element referenced where the term "upper" appears "first" can be substituted and where the term "lower" appears "second" can be substituted.

Figure 6:
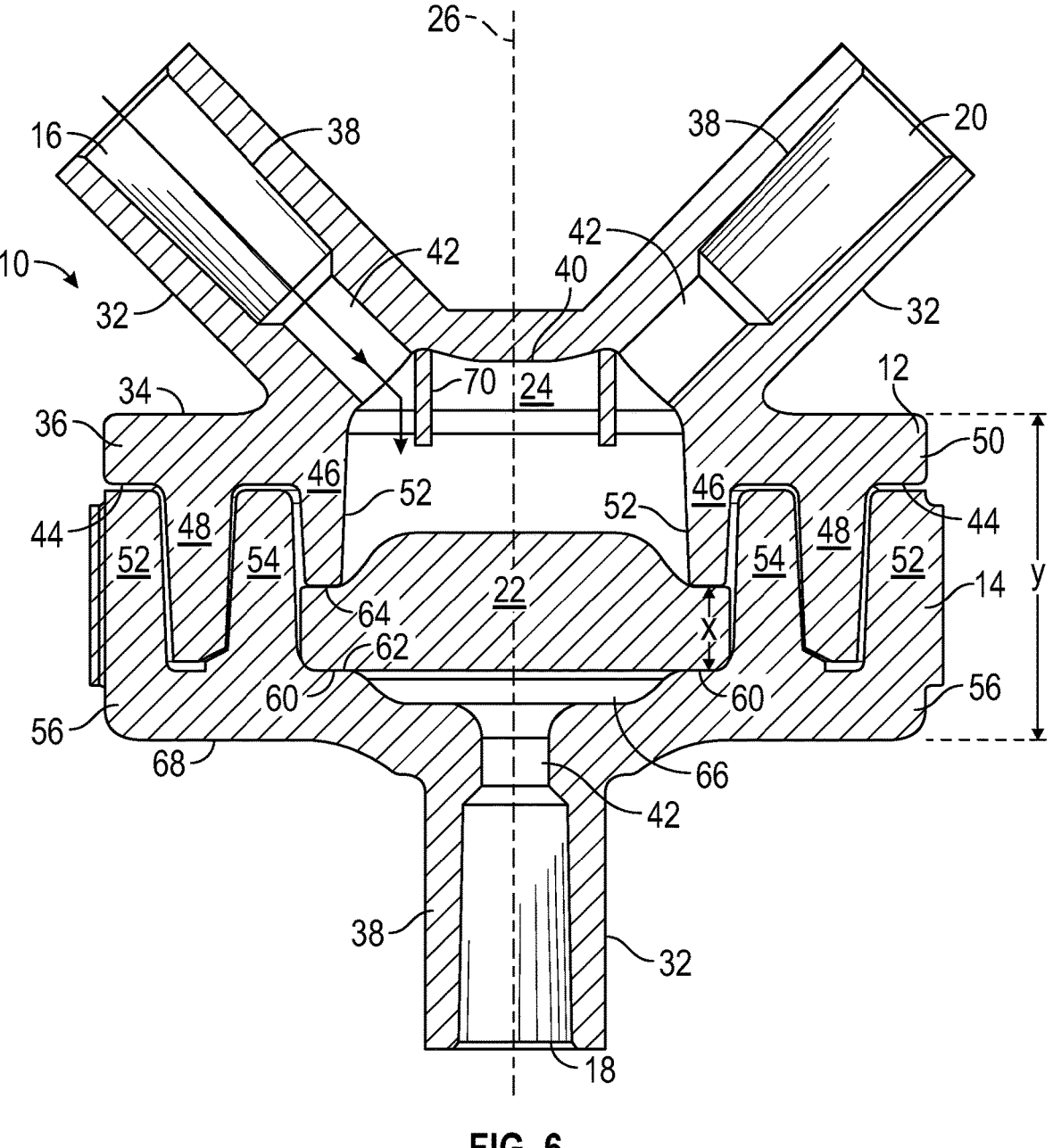
FIG. 6 is a cross section view of the chromatography device as pictured in FIG. 5 illustrating another embodiment.
Figure 7:
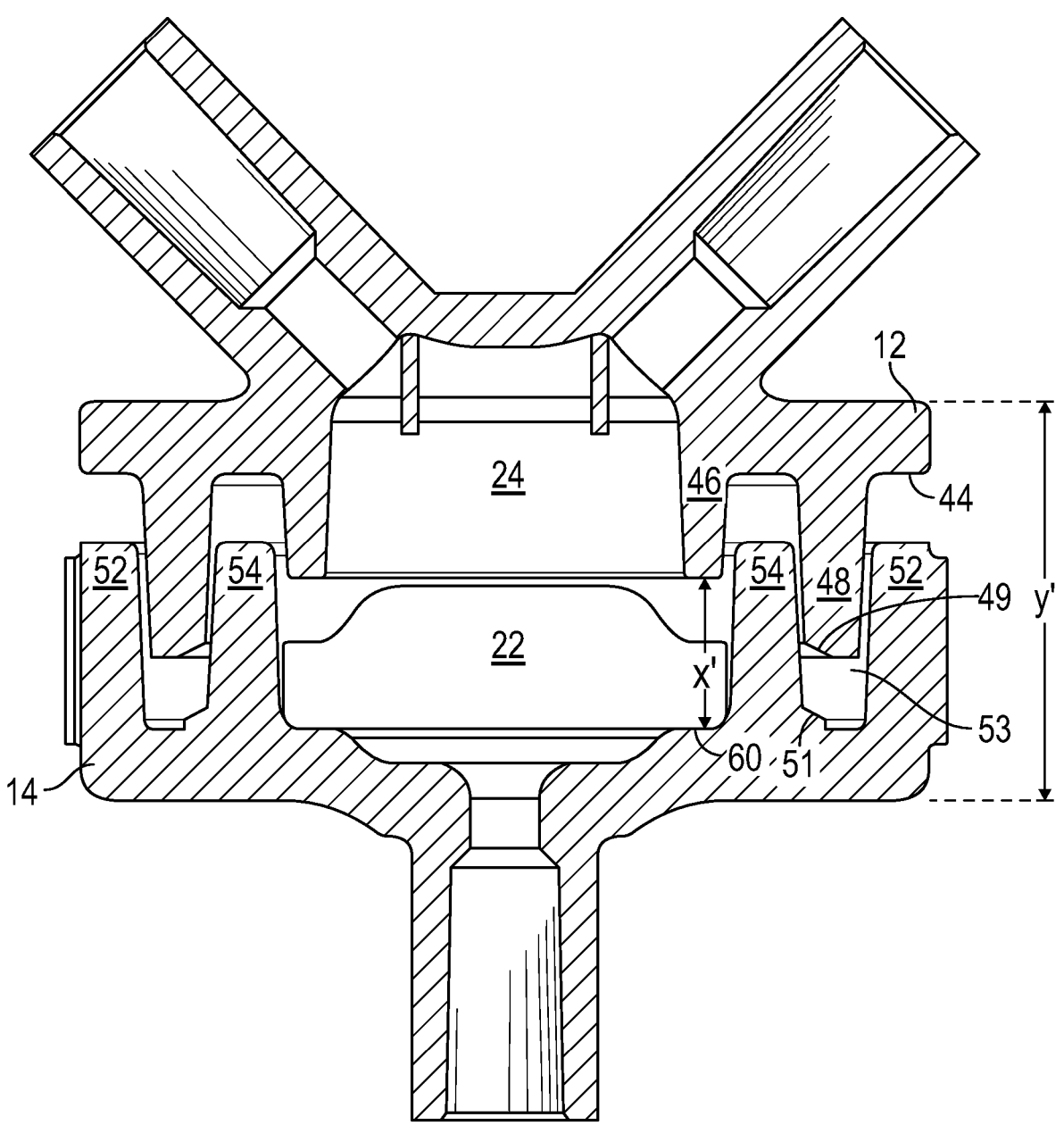
FIG. 7 is a cross section view of the chromatography device as pictured in FIG. 6 prior to ultrasonic welding of the upper and lower housing.

As seen in FIGS. 5, 6, and 7 extending from the lower surface 44 of the upper disc 36 of the upper housing 12 is a compression extension 46, which in some embodiments is a protruding ring structure. For other geometric shapes for the perimeter of the media besides circular, such as square or hexagonal, the compression extension would assume the same corresponding shape of the perimeter of the media. The compression extension 46 in cooperation with the boss 60 supporting the media 22 compresses the margin or perimeter of the media to a distance X as drawn. This seals the margin or perimeter of the media from leaking and bypassing fluid from the chamber 24 to the outlet 18 around the margin or perimeter of the media. Sufficient compression is necessary to prevent leaking; however, if the media is over compressed, too much media area is lost due to the compression and the performance of the laboratory device can deviate significantly from a scale-up or production device using the same media. Thus, the height of the compression extension protruding from the lower surface 44 in conjunction with how tightly the upper and lower housings are squeezed together while being ultrasonically welded controls the distance X and the resulting edge compression of the media disc 22. During actual ultrasonic welding, the welding energy is set to control the relative edge compression of the media. While the housing is drawn with the compression extension 46 extending from the lower surface of the upper housing in combination with a boss 60 on the lower housing the two components can be switched and the compression extension 46 can extend from the lower housing and the boss 60 can reside on the upper housing. The boss 60 can be raised up from the surrounding surfaces inside of the housing as well in an alternative embodiment. For example, two extensions can be used to squeeze the perimeter of the media to seal it.

Protruding from the lower surface 44 of the upper housing 12 is an interlocking weld extension 48 that becomes welded to the lower housing 14. In some embodiments, the interlocking weld extension is also a protruding ring with a chamfered tip 49 for use during the ultrasonic welding process. The interlocking weld extension is located outboard of the compression extension at a greater distance from the housing longitudinal axis. The interlocking weld extension 48 initially abuts a step 51 in an optional recess 53 in the lower housing as seen in FIG. 7. The central part of the housing has a height Y' before welding and the compression extension has a height of X'. Because of the chamfer and step, the final height of the housing Y can be altered with increasing amounts of ultrasonic energy applied to the housing during welding. This then affects the final compressed edge dimension X. As more energy is applied during the ultrasonic welding process, more of the step height 51 is reduced and the chamfered tip 49 slides deeper into the recess 53. Compare FIG. 7 to FIG. 6. Thus, even though the parts are fully welded to each other, the final height of the capsule Y can be varied which in turn varies the edge compression distance X. Applying more energy decreases the final assembly height Y by allowing the chamfered tip 53 and the interlocking weld extension 49 to slide deeper into the recess 53 resulting in more edge compression of the media and a reduced height X. The opposite holds true for less applied welding energy resulting is a larger final assembly height Y and less edge compression and a larger dimension X. While the housing is drawn with the interlocking weld extension 48 extending from the lower surface 44 of the upper housing 12 and the step 51 on the lower housing 14, the interlocking weld extension 48 can extend from the lower housing 14 and the step 51 can reside on the upper housing. The cross-sectional profile of the interlocking weld extension and the shape of its perimeter can be adjusted for different housing geometries. A ring shape is suitable for a circular media 22 as shown.

In one embodiment, a circular media stack was used, and the compression extension and interlocking weld extension were protruding rings as described next. Extending from the lower surface 44 of the upper disc 36 is a first protruding ring 46 for the compression extension to compress the media's margin or perimeter and a second protruding ring 48 for the interlocking weld extension that is disposed inward of an outer diameter 50 of the upper disc 36. The longitudinal length of the first protruding ring is selected to pinch and seal the media margin or perimeter. The longitudinal length of the second protruding ring is selected to ultrasonically weld and mate with features on the lower housing while allowing for the dimension X to be varied within a range of heights while still maintaining a media seal along the margin or perimeter. Media with significant thickness changes may need to have different longitudinal length dimensions for the protruding rings so as to not over compress the media reducing performance or failing to seal it along the edges to prevent bypass. As seen, the first and second protruding rings have sidewalls that taper with thicker bases and narrower tips. Other cross-sectional geometries can be utilized. The first sidewall 52 of the first protruding ring 46 forms a portion of the sidewall of the chamber 24 below the inlet and the vent.

As best seen in FIG. 5, the lower housing 14 has a third protruding ring 52 and a fourth protruding ring 54 extending from an upper surface of a lower disc 56. These protruding rings are optional, but preferred. A valley or recess 53 is formed between the two rings into which the interlocking weld extension is disposed for ultrasonic weld attachment to the lower housing. The external sidewall of the fourth protruding ring 52 forms the majority of the external sidewall of the assembled housing and can optionally be knurled or have longitudinal ribs 58 spaced along the perimeter to provide enhanced grip while handling the housing 10. The internal sidewalls of the third and fourth protruding rings are sloped to match the taper of the second protruding ring on the upper housing for nesting of the two housing portions. Nesting the interlocking weld extension 48 between the third and fourth protruding rings (52, 54) provides more structural integrity to the welded housing allowing for the assembled housing to better resist lateral forces to the housing without breaking the ultrasonic weld. Additionally, the inner surface of the third protruding ring 52 acts as a guide and a centering device for locating the circular media 22 onto the boss 60 when assembling the components as best seen in FIG. 7.

Inboard of the fourth protruding ring at the base of its innermost sidewall is the circular boss 60 that supports the perimeter of a circular media disc 22 placed into the center of the lower housing. The fourth protruding ring can generally guide the media into position and center the media onto the supporting boss 60. The distance, X, from an upper surface 62 of the boss to the tip 64 of the first protruding ring 46 (compression extension) is selected to affect the necessary compression of the media to provide a fluid tight seal along the margin or perimeter of the media disc and to best match the performance of the laboratory device to a scale-up or production device by controlling this distance during the ultrasonic welding process. Below the circular boss is an optional circular dished shaped recess 66 acting as a funnel to direct filtered fluid to the outlet. A cylindrical projection 32 parallel to and concentric with the housing longitudinal axis 26 extends from the lower surface 68 of the lower disc 56. The cylindrical projection has a tapered internal bore 38 to fit the Luer lock taper and is in fluid communication with the dished recess 66. The tapered internal bore 38 of the outlet is in fluid communication with a cylindrical passage 42 that leads to the dished recess thus providing for the passage of fluid from the dished recess through the cylindrical passage and though the tapered bore and out of the housing.

A unique feature of the housing's design is the combination of the media pinch with the discussed margin or perimeter seal of the media within the device. Typically, chromatography devices have O-rings or washers to seal and compress the media. One of the features of this design is the incorporation of the media pinch between the upper housing and lower housing via the first protruding ring's tip and the circular boss as shown in FIG. 5. This provides a straightforward way to control the media compression and can accommodate thickness variations in the chromatography media since the housing portions are ultrasonically welded under a fixed load and the final welded height can vary as the thickness of the media stack varies. This design for the device assembly combined with the ultrasonic welding of the upper and lower housing portions ensure that edge effects remain consistent despite media stack thickness variations and provides a way for predictable device capacity and pressure drop.

Typical laboratory-scale chromatography devices in the market today are made by assembling a two-piece housing (inlet housing portion, outlet housing portion) with the internal media disposed between the housing portions, compressing the overall assembled housing to a fixed height and then using an overmolding process. The overmolding process involves compressing the two housing portions to the final specified height and then shooting molten plastic onto the outside of the housing assembly to form a fluid tight housing that maintains the pre-determined compressed assembly height prior to application of the molten plastic. During this process, several tons of force can be exerted on the chromatography media, which leads to a prominent and large compressed margin or perimeter zone. This large compressed margin or perimeter zone reduces the performance of the chromatography device as discussed above. The large compression force on the assembled housing portions is necessary during the overmolding process to contain the molten plastic and prevent flash. The pre-determined mold height is selected to prevent flash. Because of this, a thicker media stack experiences a larger compression than a thinner media stack causing significant performance variations in small volume chromatography devices. This approach to making chromatography devices is less versatile in the sense that multiple molds for the overmolding process would be needed to ensure compression of the chromatography media stack at the margin or perimeter was the same for various media thicknesses.

Ultrasonic bonding on the other hand, can involve compressing the assembly of inlet housing portion, outlet housing portion and internal chromatography media stack to a specified force rather than to a fixed height. Upon reaching this pre-determined force, the ultrasonic weld process is initiated, and the vibrational energy applied to the energy director causes localized melting and bonding. In this process, only several pounds of force (orders of magnitude smaller than what is observed during the overmolding process) are experienced by the edges of the chromatography media. Ultrasonic bonding leads to a smaller compressed margin or perimeter zone and the actual amount of compression can be controlled by the applied energy during the ultrasonic welding process, which varies the final height of the assembled housing. Furthermore, because initiation of the welding is triggered by a force setpoint, normal variations in the media thickness does not appreciably impact the size of the margin or perimeter affected compression zone. Thicker media stacks will have a taller housing height and thinner stacks media will have a shorter housing height. The welding process is self-compensating for variations in media thickness. Thus, the present design provides a simple way to ensure consistent device performance.

This approach to making chromatography devices is extremely versatile and can accommodate chromatography media of different thickness. Large deviations in media stack thickness for different types of products may require different longitudinal lengths for the compression extension and the interlocking weld extension, but nominal variations due to manufacturing tolerances are readily handled and the chromatography devices produced by the method will have more consistent performance.

Referring now to FIG. 6, another embodiment of the chromatography device is shown. Extending from the ceiling of the chamber is a baffle 70 that redirects the inlet flow to a direction more parallel with the housing longitudinal axis as shown by the arrow. In one embodiment, the baffle was a fifth protruding ring having a sidewall 72 generally parallel to the longitudinal axis 26 and extending a sufficient distance in the longitudinal direction to redirect the inlet flow as described but short enough to prevent interference between swollen media and the baffle feature. The outer diameter of the fifth protruding ring is small enough to fit between the cylindrical passages 42 of the inlet and vent with the fifth protruding ring nominally starting just inboard of where these passages meet with the chamber 24 as shown. In some embodiments, the height of the fifth protruding ring in the longitudinal direction is the same order of magnitude as the diameter of the Luer connectors such as between about 3 to about 6 mm.

The baffle 70 may be required depending on the surface tension and wetting characteristics of the chromatography media. The baffle helps to direct the inlet flow of the buffer or solute along the chamber sidewall and onto the compressed margin or perimeter of the media. Since the permeability of the media can be lower in this area, the buffer or solute tends to redistribute towards the center of the media disc to pass through the media. This phenomenon is another way to combat tunneling as previously described.

The cylindrical projections forming the inlet, the outlet, and the vent can be sized to mate with tapered Luer lock connectors. To facilitate the Luer lock connector, the outer surfaces of these cylindrical projections 32 can have two opposing transverse tabs 80 extending from the outer circular diameter of the cylindrical projections and disposed near the distal ends of the cylindrical projections. The tabs engage with the threads in the male Luer lock connector. Optionally, other fluid connectors such as hose barbs can also be used to route fluids into and out of the chromatography device.

The chromatography device is preferably injection molded from a suitable material. Desirably this material is readily ultrasonically welded such that the upper housing and lower housing can be joined in a fluid tight manner. Suitable materials for the housing include thermoplastics such as Acetal (POM), Acrylic (PMMA), Acrylonitrile Butadiene Styrene (ABS), Polycarbonate (PC), Polyethylene (LD/HDPE), Polyphenylene Oxide (PPO), Polyphenylene Sulphide (PPS), Polypropylene (PP) etc.

Alternatively, other means of fastening the upper housing to the lower housing can be used such as a liquid tight, threaded connection as used for example on common water pipe. The upper and lower housings could be made of suitable materials for the threaded connection such as plastic or metal.

Alternatively, the housings can be 3D printed using a three-dimensional printer. In this case, the housings can be bonded together using adhesives such as epoxy or acrylic to form liquid tight seal.

Spacer Ring

As seen in FIGS. 9, 10, 11, 13, 14 and 15 one or more spacer rings 86 may be optionally used in the chromatography device 8 in some embodiments. The function of the spacer ring is to provide an air gap between a proceeding media layer and the following media layer in the direction of fluid flow in the chromatography device. Without wishing to be bound by theory, it is believed that the air gap allows for more rapid dispersion of liquids to the media's edges thereby helping to prevent tunneling through the media's center. The air gap can provide for direct fluid flow to the media's edges instead of relying on capillary action to move fluid to the media's edges.

Certain media, such as functionalized nonwovens, can swell upon contact with liquids and this swelling action in combination with the edge compression seal may result in undesirable tunneling. By spacing the layers apart just a bit, an air gap can be provided that allows for liquid exiting one media layer to flow laterally prior to entering the next media layer.

Therefore, the optimum height of the spacer ring is dependent on the expected media swelling that may occur.

While air gaps and spacer ring heights as small as 0.001 inches can work with non-swelling media layers, in general, a larger air gap and height of the spacer ring are used with functionalized nonwovens that tend to swell more.

In some embodiments, the height of the spacer ring in the longitudinal direction between media layers can be equal to or greater than 0.001, 0.005, 0.010, 0.020, or 0.030 inches. The maximum height of the spacer ring is often limited by the overall housing length and the height of the internal chamber within which media layers forming the media stack can be placed. Spacer rings too tall in height can reduce the thickness for media layers that can be placed into the chromatography device. Typically, the spacer rings will have a height of less than or equal to 1.0, 0.90, 0.80, 0.60, or 0.50 inches in the longitudinal direction between the media layers.

Ranges between the proceeding heights are within the scope of the invention. Particularly suitable spacer rings have a height between 0.030 and 0.050 inches in the longitudinal direction between the media layers.

The spacer ring can be constructed similar to a washer, a bushing, or a short tube having an outer diameter, an inner diameter, a central aperture or opening, and a height. The outer diameter is often sized to be the same as the outer compression seal diameter of the media. This often corresponds to the outer diameter of the compression extension 46 as seen in FIGS. 5 and 9.

The inner diameter can be smaller than the inner compression seal diameter of the media; however, this would reduce capacity and increase compression edge effects in the media's margin since more of the media's surface would be covered. Therefore, the inner diameter is approximately the same size or slightly less than the inner diameter of the media compression extension 46 as seen in FIGS. 5 and 9.

Figures 8, 9:
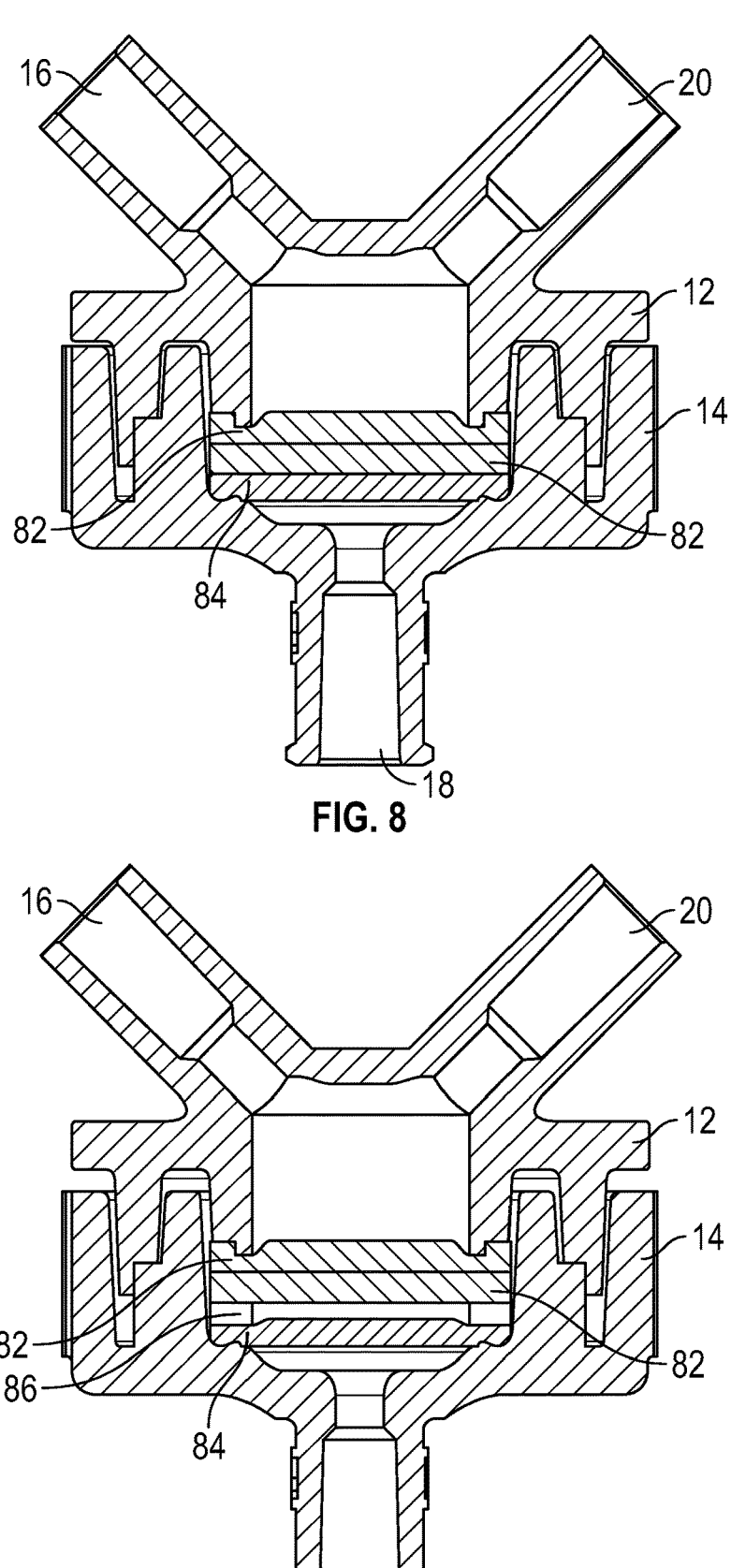
FIG. 8 is a chromatography device, in the direction from the inlet to the outlet, having a media stack comprising a layer of a functionalized nonwoven, a layer of a functionalized nonwoven, and a layer of a functionalized membrane.
FIG. 9 is a chromatography device from the inlet to the outlet having a media stack comprising a layer of a functionalized nonwoven, a layer of a functionalized nonwoven, a spacer ring, and a layer of a functionalized membrane.

In many instances, the width of the spacer ring matches the width of the compression extension 46 as seen, for example, in FIG. 9. This provides sufficient sealing area without undo edge effects or loss of device capacity.

Suitable dimensions for the outer diameter, inner diameter, and width of the spacer ring can be determined based on the specific housing design. As the housing becomes larger or smaller in diameter for various sizes of the chromatography device, the diameter of the spacer ring is likewise adjusted accordingly. In one embodiment, the outer diameter of the spacer ring was about 1.1 inches, the inner diameter was about 0.9 inch, and the width was 0.1 inch.

The number of spacer rings can be varied and often is one less than the number of media layers in the chromatography device. Thus, a two-layer device can have one spacer ring between the two media layers in the media stack and a three-layer device can have two spacer rings—one between the first and second media layers and one between the second and third media layers in the media stack. It is typically more important to space the functionalized nonwoven layers from the next layer due to swelling of this layer and less important to space the functionalized membrane layers from the next layer (since they typically do not swell) if overall height of the media stack becomes an issue to fit within the selected housing.

The spacer ring can be constructed from a number of different materials. Choice of material often depends on the reactivity of the fluid to be processed to the material. The same materials suitable for molding the housing are suitable for spacer rings. Generally, the material chosen for the housing will also be used for the spacer rings. Suitable materials for the molding the spacer ring include thermoplastics such as Acetal (POM), Acrylic (PMMA), Acrylonitrile Butadiene Styrene (ABS), Polycarbonate (PC), Polyethylene (LD/HDPE), Polyphenylene Oxide (PPO), Polyphenylene Sulphide (PPS), and Polypropylene (PP). These thermoplastic materials are readily injection molded and can be used to fabricate spacer rings of suitable dimensions.

In many embodiments, the housing has a compression extension 46 and a boss 60 between which the media stack is compressed to create an edge seal. In some embodiments, the distal portion of these surfaces that touch the media are relatively flat or planer as seen in FIG. 5. In other embodiments, the distal portion of these surfaces that touch the media comprise a pinching projection. As seen in FIG. 8, the upper housing's compression extension 46 distal end has a longer length adjacent to the interior chamber 24 and is shorter in length towards the exterior of the housing. Similarly, the circular boss 60 in the lower housing has a pinching projection extending from its surface as well. While not illustrated, the spacer ring 86 instead of having a smooth upper and a smooth lower surface as illustrated can have a pinching projection located on either or both of these surfaces as well.

The function of the pinching projection is to bite into the media to prevent it from slipping out of the edge compression zone. Preferably the pinching projection is located such that the media's margin or perimeter is compressed more in a region closer to the interior chamber 24 and compressed less in a region farther away from the interior chamber. That creates a slightly less compressed zone of media towards the exterior of the housing which must be further compressed and pulled under the pinching projection during any swelling of the media, which is less likely to happen.

The pinching projection can be a continuous ring, ridge, step, or other feature that rises up from the distal surface of the compression extension, boss, or spacer ring. Alternatively, the pinching projection can be a discontinuous surface comprised of short segments or projections that pinch or bite into the media's surface. The pinching projection has been found effective to enhance sealing of the media; especially, the functionalized nonwoven layers which tend to swell and pull out of the edge compression zone of the housing during use of the chromatography device.

Sealing Layer

Figures 12, 13:
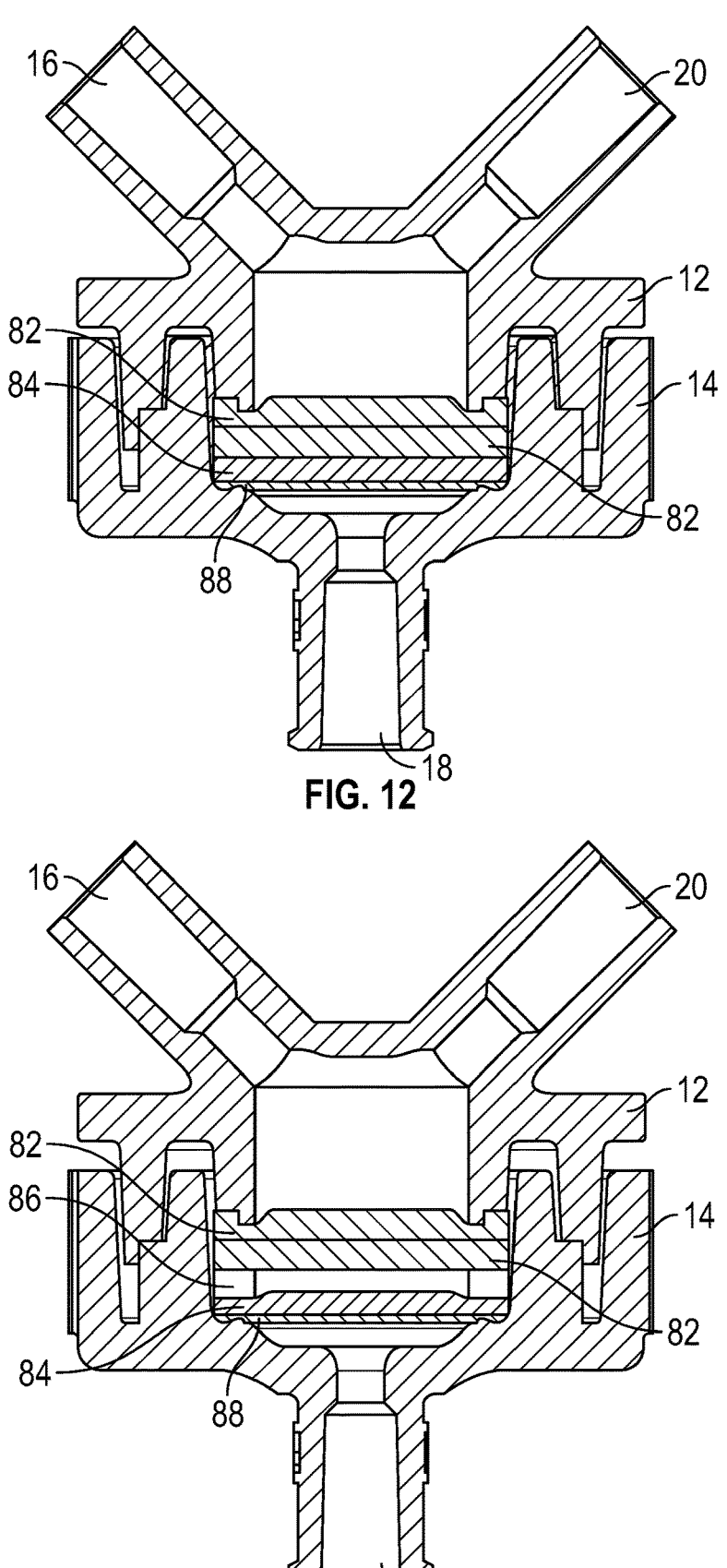
FIG. 12 is a chromatography device from the inlet to the outlet having a media stack comprising a layer of a functionalized nonwoven, a layer of a functionalized nonwoven, a layer of a functionalized membrane, and a sealing layer.
FIG. 13 is a chromatography device from the inlet to the outlet having a media stack comprising a layer of a functionalized nonwoven, a layer of a functionalized nonwoven, a spacer ring, a layer of a functionalized membrane, and a sealing layer.

As seen in FIG. 12, the sealing layer 88 is positioned as the last layer that the fluid passes through from the inlet to the outlet within a media stack of at least two layers inside of the chromatography device. The sealing layer is in contact with the housing and at least a portion of its margin or perimeter forms a compression seal in the chromatography device. Since this is the last compression seal of a layer that the fluid can pass under or past on its exit out of the housing (lowest layer in the media stack), it is the most important layer to seal to the housing within the chromatography device.

The sealing layer is a non-functionalized layer as defined herein. It has been found that functionalized layers, as defined herein, do not achieve as good of a compression seal with the housing and the LRV of a chromatography device when this is the last layer of the media stack for sealing is less than a similarly constructed chromatography device having the same media stack layer construction but only having the addition of a sealing layer of a non-functionalized media as the last layer of the media stack in contact with the housing.

The sealing layer is a non-functionalized porous media that can have a relatively smooth surface and sufficient stiffness via its thickness to support a functionalized layer above it from sagging and slipping out of the edge seal under pressure forces due to the differential pressure generated in use by the flow across the media layers. The sealing layer may be a membrane or a nonwoven layer. In a preferred embodiment, the sealing layer is a membrane since they often have a smoother surface roughness. The sealing layer may comprise a multi-component material having one ply of membrane and another media such as a scrim layer. Alternatively, the sealing layer may comprise two or more plies of membrane or other media.

When the sealing layer is a membrane, it can be formed of any suitable membrane-forming material, such as poly-amides (including Nylon-6, or Nylon-6,6), polysulfones (including Bisphenol A polysulfone and polyethersulfone), polypropylene, polyethylene, and fluorinated polymers including polyvinylidene fluoride and polytetrafluoroethyl-ene. The membrane can be a supported membrane, meaning that it is cast on a porous support layer such as a nonwoven layer, spunbond layer, fabric layer, scrim, or the like. Alternatively, the membrane can by an unsupported membrane, meaning that it is formed of a membrane-forming material without the aid of a support layer. The membrane can be a symmetric membrane, meaning that the average pore size at any position between the two outside major surfaces of the membrane are substantially the same. Alternatively, the membrane can be an asymmetric or gradient membrane, meaning the average pore size in the region near one major surface of the membrane is substantially larger than the average pore size in the region near the opposing major surface of the membrane. Still further, the membrane may be a multizone membrane, meaning that it comprises a through-thickness zone between its major outside surfaces which has an average pore size different than the average pore size in another through-thickness zone between the major outside surfaces of the membrane. In some embodiments, the seal-ing layer comprises a supported Nylon-6,6 membrane as described in U.S. Pat. No. 6,264,044, entitled "Reinforced, three zone microporous membrane," issued on Jul. 24, 2001, and hereby incorporated in its entirety by reference.

In one embodiment, the sealing layer was a Nylon-6,6 membrane having an average pore size of 0.8 micrometers. The thickness of this sealing layer was in the range of 17 to 20 mils. Other materials suitable for the sealing layer include a Nylon-6,6 membrane having an average pore size of 0.8 micrometers and a thickness of 8.5-10.0 mils; Nylon-6,6 membrane having an average pore size of 0.65 micrometers and a thickness of 6.0-7.0 mils; Nylon-6,-6 membrane having an average pore size of 0.2 micrometers and a thickness of 6.0-7.0 mils; Nylon-6,-6 membrane having a pore size in the range of 0.2-1.2 micrometers and a thickness of 13.0-15.4 mils.

In various embodiment of the inventions, the membrane for a sealing layer can have a smallest pore size within the membrane from 0.1 to 5.0, or 0.1 to 3.0, or 0.2 to 1.2 micrometers and a thickness from 6.0 to 20.0 mils.

As will be seen in the Examples, the following materials were found not to increase the LRV of the chromatography device and did not function as a suitable sealing layer. A spun bond nonwoven having an average thickness of 9 mils. A polyethersulfone membrane having an average pore size of 0.2 micrometers and a thickness of 100-120 micrometers and a spun bond nonwoven described above, both bonded to the outlet shell of the laboratory device ultrasonically to provide a stiff support structure.

Without wishing to be bound by theory, it is believed that the sealing layer provides a consistent seal since it does not undergo morphological changes when in contact with the challenge solution like a functionalized layer can. Also, when a membrane is used as the sealing layer, the media often does not allow for any significant tangential flow improving the sealing performance. Often the sealing layer can be formed from the same media used to make the functionalized layer but without any coating or grafting treatment to functionalize it. Thus, it can have relatively the same thickness and pore distribution as one of the function-alized layers within the chromatography device. In a pre-ferred embodiment a functionalized membrane is used as one of the chromatography media layers, and the same precursor membrane prior to functionalization is used as the sealing layer.

A chromatography device with a media or membrane volume of approximately 0.08 mL was evaluated when using spacer rings, a sealing layer, or both. The upper and lower housings and the spacer rings (0.050 inches in height) are injection molded using a polypropylene random copo-lymer with a mass melt flow rate (MFR) of 9.0 g/10 min. The selected chromatography media had three primary compo-nents: an anion exchange nonwoven, an anion exchange membrane, and a sealing layer. The anion exchange non-woven layer was composed of four plies of polypropylene nonwoven with a covalently attached quaternary ammonium functional polymer. The anion exchange membrane layer is composed of three plies of high-porosity polyamide mem-brane with a covalently attached guanidinium functional polymer. In some embodiments, this is followed by a polyamide non-functionalized membrane used as a sealing layer in the assembled housing capsule.

Examples FIGS. 8-15

To assemble the chromatography device, the media com-ponents are punched to obtain discs of 1.0625 inches in diameter. The discs are placed in the lower housing 14 inward of the protruding ring 54. Spacer rings 86 are added between the functionalized membrane and nonwoven layers. The upper housing is positioned on top of the media such that the protruding ring 48 of the upper housing slides between the protruding rings 52 and 54 of the lower housing. This assembly is inverted and placed in a nest or fixturing such that the outer face 68 of the lower housing 14 can come in contact with the ultrasonic horn. To weld the parts, a Branson 20 kHz Ultrasonic welder (Model 2000xdt), a black booster, and a horn with a gain of 2.5× is used. An air pressure of 80 psi, down speed of 10%, amplitude of 80%, weld time of 2 sec, and a trigger force of 200 lbf to start welding were set as fixed parameters. The weld energy was varied from 200-600 Joules to get samples with consistent compression levels depending on the number of spacer rings and sealing layer. The housing assembly with the chroma-tography media is placed in a nest directly below the horn such that housing longitudinal axis 26 is aligned to the axis of the ultrasonic horn. When the welding process is initiated, the horn comes down on the lower housing compressing the housing and the media assembly until a force of 200 lbf is reached. At this point, the shear energy directors are under compression. The horn starts to vibrate delivering the set amount of energy to the plastic energy directors and causing localized melting and bonding. After the weld duration, the horn retracts leaving the welded chromatography device in the nest.

In the case of Polyethersulfone (PES) sample, as will be seen, the PES membrane and a thin spun bond nonwoven layers are placed in the lower housing 14 inward of the protruding ring 54 such that the spun bond nonwoven layer is in contact with the lower housing 14. The lower housing is positioned in the lower nest such that the PES membrane can come in contact with the ultrasonic horn. To weld the membrane and the support nonwoven layer, a Branson 20 kHz Ultrasonic welder (Model 2000xdt), a gold booster, and a horn with a gain of 1.5× is used. An air pressure of 10 psi, down speed of 10%, amplitude of 80%, weld time of 0.05 sec, and a trigger force of 10 lbf to start welding were set as fixed parameters. The weld energy of 100 J was found to give good uniform weld without damaging the membrane.

All chromatography device samples were autoclaved at 121° C. for 30 mins using a PreVac cycle. After the autoclave sterilization, the samples were left at room temperature to cool down completely before testing.

To evaluate the viral clearance performance of chromatography devices, Cole Parmer MasterFlex Peristaltic pumps were set up with MasterFlex tubing and base sanitized with 0.5 M Sodium Hydroxide (NaOH) for at least 30 min. After sanitization, sterilized chromatography devices were connected to the peristaltic pumps. The Chloride (Cl⁻) DBC of the sterilized samples were measured as discussed above in accordance with U.S. patent application Ser. No. 67/783, 319. Following this, the chromatography devices are flushed with 15 mL of 50 mM Tris-HCl buffer solution having a pH 8 and conductivity of 20 mS/cm. Next, 15 mL of viral challenge solution was perfused through the chromatography device and eluate was collected. The input and the eluate solutions are plated and the LRV is calculated using Equations 2 and 3.

The BSA DBC of the chromatography devices were tested on an Äkta Pure System (GE Healthcare Life Sciences). Inline, UV-monitoring at 280 nm is used to detect protein breakthrough. The Chloride (Cl⁻) DBC of the sterilized samples were measured first as discussed above in accordance with U.S. patent application Ser. No. 67/783,319. Following this, the chromatography devices are flushed with 25 mM Tris 50 mM NaCl buffer having a pH of 8 at 1.94 (mL/min)/cm² media. The chromatography devices are then challenged with a ~1 mg/mL BSA solution in the previously mentioned buffer until 10% breakthrough occurs. To establish the termination point of the test, absorbance is measured at 280 nm for the BSA challenge solution and 10% breakthrough value is calculated. The Dynamic Binding Capacity (DBC) at 10% breakthrough for the chromatography device is calculated using Equation 1.

Referring now to the FIGS. 8-15, various combinations of media layers, spacer rings, and sealing membranes as described above are shown in different chromatography devices.

Control

FIG. 8 is a chromatography device, in the direction from the inlet to the outlet, having a media stack comprising a layer of a functionalized nonwoven 82, a layer of a functionalized nonwoven 82, and a layer of a functionalized membrane 84. No spacer rings or sealing membranes are used and this represents a control device to the following constructions. The device was found to have a Cl⁻ DBC of 4.07 Cl⁻/cm², BSA DBC of 14.73 mg/cm² and an LRV of 3.83.

Spacer Ring(s)

FIG. 9 is a chromatography device from the inlet to the outlet having a media stack comprising a layer of a functionalized nonwoven 82, a layer of a functionalized nonwoven 82, a spacer ring 86, and a layer of a functionalized membrane 84. The device was found to have a Cl⁻ DBC of 5.74 Cl⁻/cm², BSA DBC of 19.42 mg/cm² and an LRV of 4.28.

Figures 10, 11:
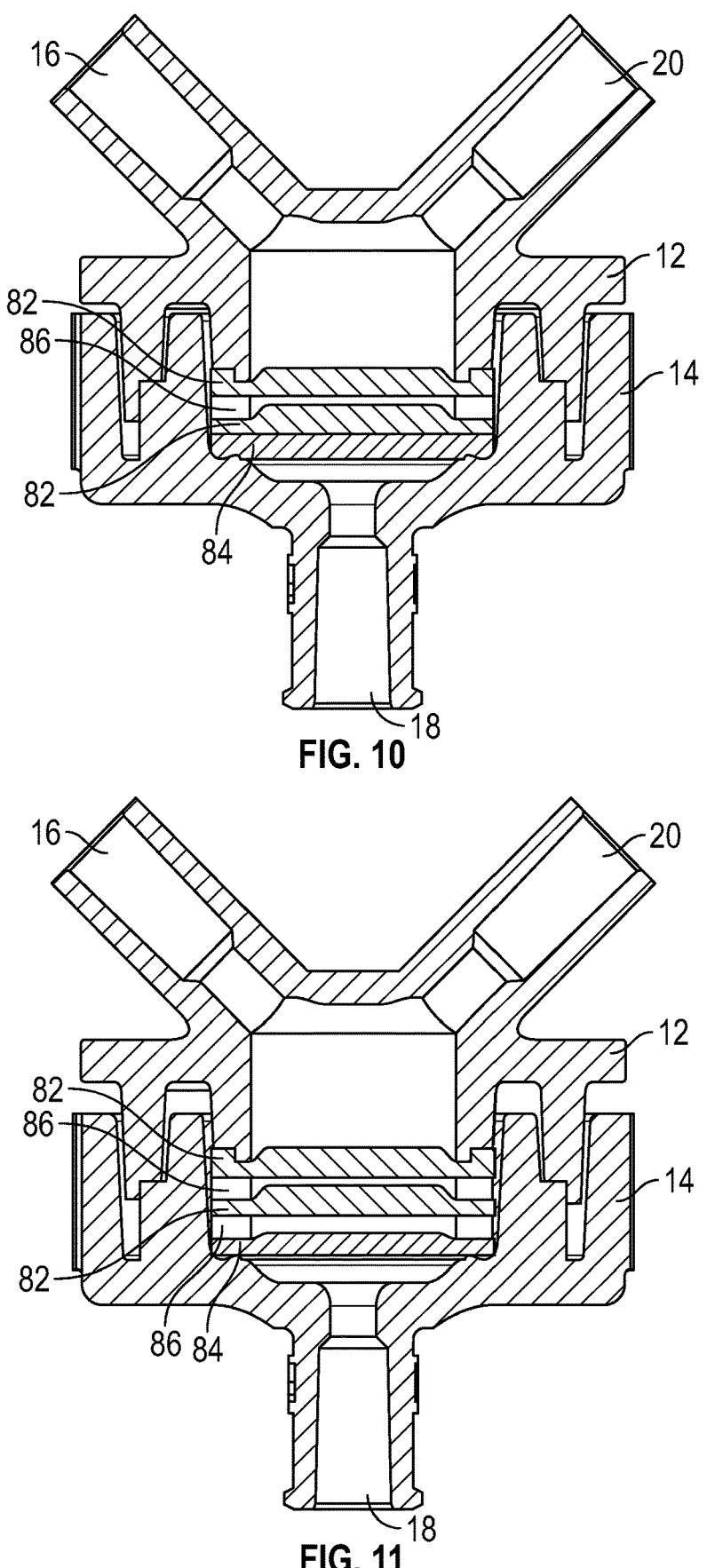
FIG. 10 is a chromatography device from the inlet to the outlet having a media stack comprising a layer of a functionalized nonwoven, a spacer ring, a layer of a functionalized nonwoven, and a layer of a functionalized membrane.
FIG. 11 is a chromatography device from the inlet to the outlet having a media stack comprising a layer of a functionalized nonwoven, a spacer ring, a layer of a functionalized nonwoven, a spacer ring, and a layer of a functionalized membrane.

FIG. 10 is a chromatography device from the inlet to the outlet having a media stack comprising a layer of a functionalized nonwoven 82, a spacer ring 86, a layer of a functionalized nonwoven 82, and a layer of a functionalized membrane 84. The device was found to have a Cl⁻ DBC of 5.28 Cl⁻/cm², BSA DBC of 18.04 mg/cm² and an LRV of 4.22.

FIG. 11 is a chromatography device from the inlet to the outlet having a media stack comprising a layer of a functionalized nonwoven 82, a first spacer ring 86, a layer of a functionalized nonwoven 82, a second spacer ring 86, and a layer of a functionalized membrane 84. The device was found to have a Cl⁻ DBC of 6.21 Cl⁻/cm², BSA DBC of 20.23 mg/cm² and an LRV of 4.47.

Sealing Layer

FIG. 12 is a chromatography device from the inlet to the outlet having a media stack comprising a layer of a functionalized nonwoven 82, a layer of a functionalized nonwoven 82, a layer of a functionalized membrane 84, and a sealing layer 88. The device was found to have a Cl⁻ DBC of 3.27 Cl⁻/cm², BSA DBC of 13.34 mg/cm² and an LRV of 6.74.

Sealing Layer and Spacer Ring(s)

FIG. 13 is a chromatography device from the inlet to the outlet having a media stack comprising a layer of a functionalized nonwoven 82, a layer of a functionalized nonwoven 82, a spacer ring 86, a layer of a functionalized membrane 84, and a sealing layer 88. The device was found to have a Cl⁻ DBC of 5.42 Cl⁻/cm², BSA DBC of 19.79 mg/cm² and an LRV of 7.62.

Figures 14, 15:
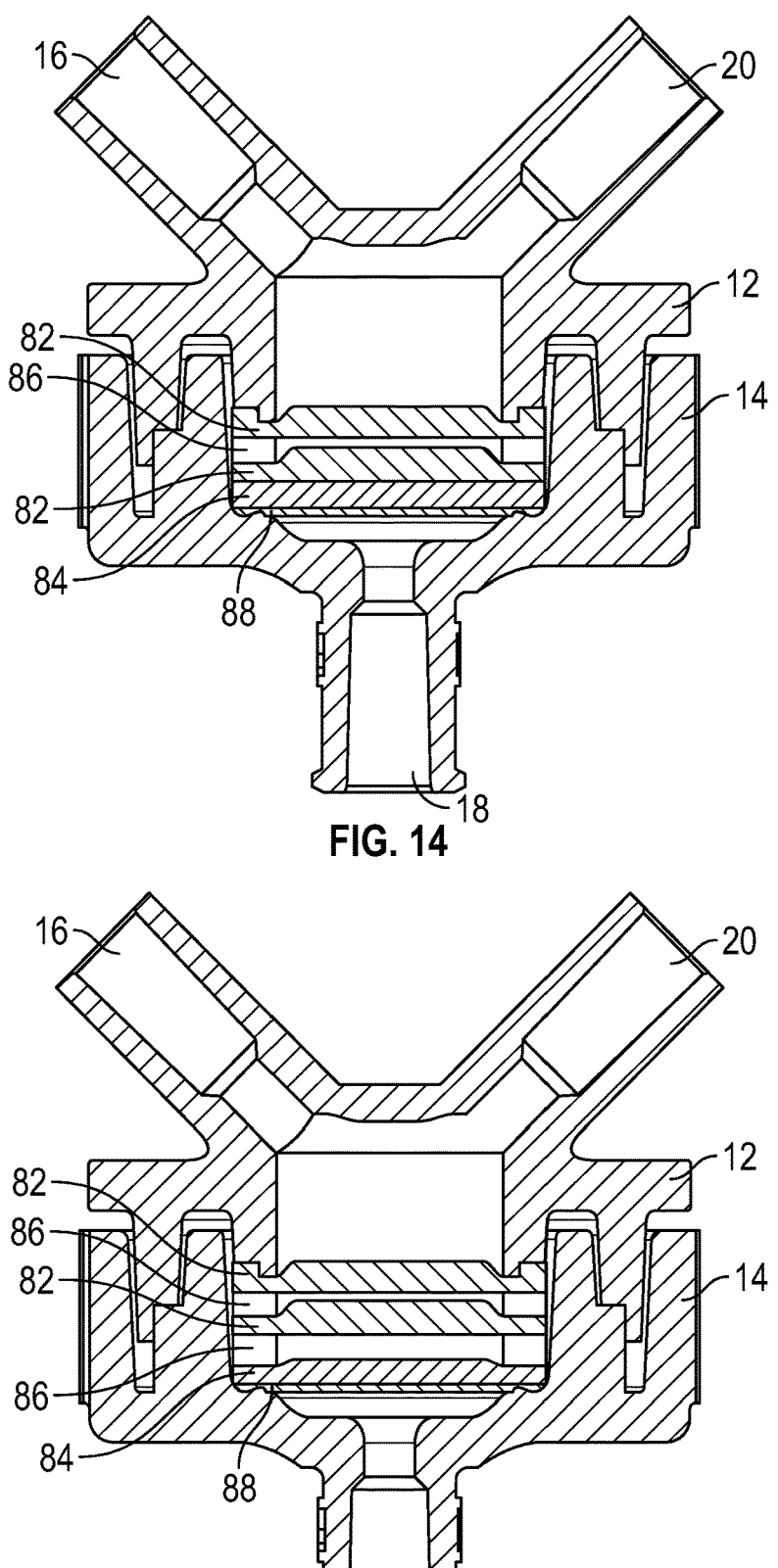
FIG. 14 is a chromatography device from the inlet to the outlet having a media stack comprising a layer of a functionalized nonwoven, a spacer ring, a layer of a functionalized nonwoven, a layer of a functionalized membrane, and a sealing layer.
FIG. 15 is a chromatography device from the inlet to the outlet having a media stack comprising a layer of a functionalized nonwoven, a spacer ring, a layer of a functionalized nonwoven, a spacer ring, a layer of a functionalized membrane, and a sealing layer.

FIG. 14 is a chromatography device from the inlet to the outlet having a media stack comprising a layer of a functionalized nonwoven 82, a spacer ring 86, a layer of a functionalized nonwoven 82, a layer of a functionalized membrane 84, and a sealing layer 88. The device was found to have a Cl⁻ DBC of 4.48 Cl⁻/cm², BSA DBC of 17.22 mg/cm² and an LRV of 7.00.

FIG. 15 is a chromatography device from the inlet to the outlet having a media stack comprising a layer of a functionalized nonwoven 82, a first spacer ring 86, a layer of a functionalized nonwoven 82, a second spacer ring 86, a layer of a functionalized membrane 84, and a sealing layer 88. The device was found to have a Cl⁻ DBC of 5.82 Cl⁻/cm², BSA DBC of 19.93 mg/cm² and an LRV of 7.74.

TABLE-1

| Sample | Spacer Rings | Sealing Layer | CL-DBC | BSA-DBC | LRV |
|--------|--------------|---------------|--------|---------|-----|
| FIG. 8 | None | No | 4.07 | 14.73 | 3.83 |
| FIG. 9 | One FNW to FM | No | 5.74 | 19.42 | 4.28 |
| FIG. 10 | One FNW to FNW | No | 5.28 | 18.04 | 4.22 |
| FIG. 11 | Two | No | 6.21 | 20.23 | 4.47 |
| FIG. 12 | None | Yes | 3.27 | 13.34 | 6.74 |
| FIG. 13 | One FNW to FM | Yes | 5.42 | 19.79 | 7.00 |
| FIG. 14 | One FNW to FNW | Yes | 4.48 | 17.22 | 7.00 |
| FIG. 15 | Two | Yes | 5.82 | 19.93 | 7.74 |

Comparing the Control of FIG. 8 to FIGS. 9-11, it can be seen that the addition of one or more spacer rings without a sealing layer improves the Dynamic Binding Capacity by 22.5% to 52.6%. See Table 3. This is a significant increase in performance without the addition of more functionalized media! Comparing the Control of FIG. 8 to FIG. 12, the addition of a sealing layer improves the LRV by 75.8%. This is a significant increase in viral clearance for the chromatography device. The chromatography device of FIG. 15 had a 43.0% increase in the CL-DBC and a 102% increase in the LRV over the Control of FIG. 8 when two spacer rings were used in combination with a sealing layer.

Additional Sealing Layer Examples

To demonstrate the effect of sealing layer on the viral clearance performance of chromatography device, samples with different sealing layers were produced. The LRV values for various embodiments discussed herein is summarized in Table-2.

TABLE-2

| Sealing Layer | Avg. Pore Size (micrometer) | Avg. Thickness (mil) | Cl⁻ DBC (Cl⁻/cm2) | Avg. (LRV) |
|---|---|---|---|---|
| No sealing layer, functionalized membrane is the last layer | 0.8 | 18.5 | 6.21 | 4.47 |
| PES Membrane + PP Spun bond Nonwoven (Bonded to Outlet) | 0.2 | 13.30 | 5.39 | 4.20 |
| PP Spun bond Nonwoven | — | 9.00 | 6.76 | 4.31 |
| Nylon 6, 6 Membrane | 0.8 | 18.50 | 6.32 | >6.49 |
| Nylon 6, 6 Membrane | 0.8 | 9.25 | 6.20 | >6.10 |
| Nylon 6, 6 Membrane | 0.65 | 6.5 | 6.73 | >6.48 |
| Nylon 6, 6 Membrane | 0.2 | 6.5 | 6.68 | >6.49 |
| Nylon 6, 6 Asymmetric Membrane | 1.2-0.2 | 14.20 | 6.38 | >6.12 |

FIG. 15 exemplifies a construction wherein a sealing layer 88 is used as the last layer of the chromatography device adjacent to the outlet and which is in compressive sealing contact with the housing to prevent bypass around the sealing layer. The chromatography device has a functionalized nonwoven layer 82 of two plies, a spacer ring 86 of 50 mil thickness, a second functionalized nonwoven layer 82 of two plies, another spacer ring 86 of 50 mil thickness, a functionalized membrane layer 84 of three plies, and a sealing layer 88 as the fluid moves from the inlet to the outlet.

FIG. 11 exemplifies a construction wherein a functionalized membrane is used as the last layer of the chromatog- Referring to Table 2, the Log Reduction Value (LRV) for the construction of FIG. 15 is at least 6.49 while the LRV of FIG. 11 is only 4.47. When the functionalized membrane is used as the last layer of the chromatography device and is in sealing contact with the housing, viruses are able to more readily leak past the lower surface of the media that is in compressive contact with the housing bypassing the functionalized layer and pass into the outlet reducing the device's LRV. On the other hand, when a sealing layer is used in this position just below the functionalized layer an improved compression seal occurs and the LRV is increased by an amazing 45.2%. These are amazing increases in performance without adding any additional functionalized material to the device. In various embodiments, the LRV of a media stack in a chromatography device when using a sealing layer, can increase by at least 20%, 30%, 40%, 50%, 60%, 70%, 80%, 90%, or even 100% percent compared to the same media stack in control chromatography device not having the sealing layer.

Additional Spacer Ring Discussion

FIGS. 9, 10, 11, 13, 14 and 15 exemplify various constructions wherein at least one spacer ring is placed between two layers in the chromatography device. In some embodiments, only a single spacer ring is used and in other embodiments two spacer rings are used. Each of the chromatography devices has a functionalized nonwoven layer of two plies, a second functionalized nonwoven layer of two plies, and a functionalized membrane layer of three plies as the fluid moves from the inlet to the outlet. One or more spacer rings are placed between the various layers as shown.

FIG. 8 shows a control chromatography device having a functionalized nonwoven layer of two plies, a second functionalized nonwoven layer of two plies, and a functionalized membrane layer of three plies as the fluid moves from the inlet to the outlet. The same materials and weights of the materials for the layers are used as for the Examples of FIGS. 9, 10, and 11. FIG. 12 shows a chromatography device having a nylon 6, 6 membrane with an average pore size of 0.8 micrometers as the sealing layer. The thickness of this sealing layer was in the range of 17 to 20 mils. FIGS. 13, 14 and 15 exemplify various constructions wherein at least one spacer ring is placed between two layers in the chromatography device in addition to incorporating a sealing layer.

TABLE-3

| FIG. | Energy (J) | SL | 3FM | Ring | 2FNW | Ring | 2FNW | Cl⁻ DBC (mL) | Cl⁻ DBC % Increase | BSA DBC (mg/cm²) | BSA DBC % Increase |
|---|---|---|---|---|---|---|---|---|---|---|---|
| 8 | 600 | | x | | x | | x | 4.07 | — | 14.73 | — |
| 9 | 350 | | x | x | x | | x | 5.74 | 41.2 | 19.42 | 31.9 |
| 10 | 350 | | x | | x | x | x | 5.28 | 29.8 | 18.04 | 22.5 |
| 11 | 250 | | x | x | x | x | x | 6.21 | 52.6 | 20.23 | 37.3 |
| 12 | 500 | x | x | | x | | x | 3.27 | −19.6 | 13.34 | −9.4 |
| 13 | 300 | x | x | x | x | | x | 5.42 | 33.2 | 19.79 | 34.4 |
| 14 | 300 | x | x | | x | x | x | 4.48 | 10.1 | 17.22 | 16.9 |
| 15 | 200 | x | x | x | x | x | x | 5.82 | 43.2 | 19.93 | 35.3 | raphy device adjacent to the outlet and which is in compressive sealing contact with the housing to prevent bypass. The chromatography device has a functionalized nonwoven layer of two plies 82, a spacer ring 86 of 50 mil thickness, a second functionalized nonwoven layer 82 of two plies, another spacer ring 86 of 50 mil thickness and a functionalized membrane layer 84 of three plies as the fluid moves from the inlet to the outlet. The same materials and weights of the materials are used as for the Example of FIG. 15.

Referring to Table 3, the BSA Dynamic Binding Capacity for the FIG. 8 control was 14.73 (mg/cm2) and the Chloride Capacity was 4.07 (mL). The various spacer ring constructions in FIGS. 9, 10, and 11 increased the capacities under the two tests in a range of 22.5% to 52.6%. The various spacer ring constructions in FIGS. 13, 14, and 15 with the sealing layer increased the capacities under the two tests in a range of 10.1% to 43.2%. This is a significant increase in capacity considering that no additional material was added to the layers over the control chromatography device in FIG.

8. As seen above, the DBC of a media stack in a chromatography device when using one or more spacer rings can increase by at least 10%, 20%, 30%, 40%, or 50% percent when testing either the Cl⁻ DBC or the BSA DBC of the chromatography device as compared to the same media stack in a control chromatography device not having the spacer rings.

What is claimed is:

1. A chromatography device comprising:
a housing having an inlet and an outlet;
   at least one functionalized media layer disposed between the inlet and the outlet inside of the housing;
   a non-functionalized sealing layer disposed between the inlet and the outlet inside of the housing as the last and final layer of media in a media stack within the housing, and wherein a fluid is configured to pass from the inlet to the outlet through the media stack; and
   an edge of the sealing layer in contact with the housing; the edge configured to be compressed by the housing and forming a compressive seal between the sealing layer and the housing, and prevent the fluid from leaking to the outlet past the compressive seal.

2. The chromatography device of claim 1 wherein the sealing layer comprises a membrane.

3. The chromatography device of claim 2 wherein the sealing layer membrane comprises a precursor having the same material structure as the functionalized media layer prior to functionalization.

4. The chromatography device of claim 2 wherein the sealing layer membrane comprises a multizone membrane having varying pore sizes in different zones.

5. The chromatography device of claim 2 wherein the sealing layer membrane compromises a symmetric membrane having a substantially constant pore size.

6. The chromatography device of claim 2 wherein the sealing layer membrane comprises a polyamide.

7. The chromatography device of claim 6 wherein the sealing layer membrane comprises Nylon 6,6.

8. The chromatography device of claim 2 wherein the sealing layer membrane comprises a supported membrane cast on a porous support layer.

9. The chromatography device of claim 2 wherein the sealing layer membrane comprises an average pore size from 0.1 to 5.0 micrometers.

10. The chromatography device of claim 2 wherein the sealing layer membrane comprises a thickness from 6 to 20 mils.

11. The chromatography device of claim 2 wherein an LRV of the media stack in the chromatography device when using the sealing layer increases by at least 20 percent when compared to the same media stack in a control chromatography device not having the sealing layer.

12. The chromatography device of claim 11 wherein the LRV increases by at least 70 percent.

13. A chromatography device comprising:
a housing having an inlet and an outlet;
at least two layers of media disposed between the inlet and the outlet inside of the housing forming a media stack, with at least one of the layers comprising a functionalized layer;
   a spacer ring disposed between the two layers of media forming an air gap between them;
   a non-functionalized sealing layer disposed between the inlet and the outlet inside of the housing as the last and final layer of media in a media stack within the housing, and wherein a fluid is configured to pass from the inlet to the outlet through the media stack; and
   an edge of the sealing layer in contact with the housing; the edge configured to be compressed by the housing and forming a compressive seal between the sealing layer and the housing, and prevent the fluid from leaking to the outlet past the compressive seal.

14. The chromatography device of claim 13 wherein the media stack comprises a functionalized nonwoven layer and a functionalized membrane layer and the spacer ring disposed between them.

15. The chromatography device of claim 13 wherein the media stack comprises a functionalized nonwoven layer, another functionalized nonwoven layer, and the spacer ring disposed between them.

16. The chromatography device of claim 13 wherein the media stack comprises a functionalized nonwoven layer, a first spacer ring, another functionalized nonwoven layer, a second spacer ring, and a functionalized membrane layer.

17. The chromatography device of claim 13 wherein the functionalized layer is a functionalized nonwoven.

18. The chromatography device of claim 13 wherein the spacer ring comprises a height and the height is from 0.030" to 0.050" inches.

19. The chromatography device of claim 13 wherein the spacer ring comprises a rigid material selected from the group consisting of Acetal (POM), Acrylic (PMMA), Acrylonitrile Butadiene Styrene (ABS), Polycarbonate (PC), Polyethylene (LD/HDPE), Polyphenylene Oxide (PPO), Polyphenylene Sulphide (PPS), and Polypropylene (PP).

20. The chromatography device of claim 13 wherein the media stack in the chromatography device when using the spacer ring has an increase in a DBC of at least 10 percent when testing either a Cl DBC or a BSA DBC of the chromatography device as compared to the same media stack in a control chromatography device not having the spacer ring.

21. The chromatography device of claim 13 wherein the sealing layer comprises a membrane.

22. The chromatography device of claim 13 wherein the sealing layer membrane comprises a polyamide.

23. The chromatography device of claim 13 wherein the sealing layer membrane comprises a supported membrane cast on a porous support layer.

24. The chromatography device of claim 13 wherein the sealing layer membrane comprises an average pore size from 0.1 to 5.0 micrometers.

25. The chromatography device of claim 13 wherein the sealing layer membrane comprises a thickness from 6 to 20 mils.

26. The chromatography device of claim 13 wherein an LRV of the media stack in the chromatography device when using the sealing layer increases by at least 20 percent when compared to the same media stack in a control chromatography device not having the sealing layer.

* * * * *